(12) United States Patent
Johanson et al.

(10) Patent No.: US 7,702,729 B2
(45) Date of Patent: Apr. 20, 2010

(54) EVENT HEAP: A COORDINATION INFRASTRUCTURE FOR DYNAMIC HETEROGENEOUS APPLICATION INTERACTIONS IN UBIQUITOUS COMPUTING ENVIRONMENTS

(76) Inventors: Bradley E. Johanson, 2850 Middlefield Rd. #234, Palo Alto, CA (US) 94306; Armando Fox, 251 Surrey St., San Francisco, CA (US) 94131; Terry A. Winograd, 746 Esplanada Way, Stanford, CA (US) 94305; Patrick M. Hanrahan, 40 Minoca Rd., Portola Valley, CA (US) 94028

( * ) Notice: Subject to any disclaimer, the term of this patent is extended or adjusted under 35 U.S.C. 154(b) by 1014 days.

(21) Appl. No.: 10/821,756

(22) Filed: Apr. 8, 2004

(65) Prior Publication Data

US 2004/0243663 A1    Dec. 2, 2004

Related U.S. Application Data

(60) Provisional application No. 60/461,520, filed on Apr. 8, 2003.

(51) Int. Cl.
   *G06F 15/16* (2006.01)
(52) U.S. Cl. .................. 709/205; 709/206; 709/207; 709/223; 707/10; 717/144; 718/101
(58) Field of Classification Search .......... 709/205–207
   See application file for complete search history.

(56) References Cited

U.S. PATENT DOCUMENTS

| | | | | |
|---|---|---|---|---|
| 5,692,193 | A * | 11/1997 | Jagannathan et al. | 718/106 |
| 5,745,703 | A * | 4/1998 | Cejtin et al. | 709/238 |
| 5,974,420 | A * | 10/1999 | Lehman et al. | 707/101 |
| 6,314,422 | B1 * | 11/2001 | Barker et al. | 707/10 |
| 6,360,217 | B1 * | 3/2002 | Gopal et al. | 707/3 |
| 6,477,373 | B1 * | 11/2002 | Rappaport et al. | 455/436 |
| 6,594,774 | B1 * | 7/2003 | Chapman et al. | 714/2 |
| 6,647,432 | B1 * | 11/2003 | Ahmed et al. | 719/318 |
| 6,704,734 | B2 * | 3/2004 | Young et al. | 707/10 |

(Continued)

OTHER PUBLICATIONS

Johanson, Brad et al., Tuplespaces as Coordination Infrastructure for Interactive Workspaces, Sep.30, 2001, pp. 1-6.*

(Continued)

*Primary Examiner*—Hassan Phillips
*Assistant Examiner*—Backhean Tiv
(74) *Attorney, Agent, or Firm*—Lumen Patent Firm

(57) ABSTRACT

An efficient and adaptive middleware infrastructure called the Event Heap system dynamically coordinates application interactions and communications in a ubiquitous computing environment, e.g., an interactive workspace, having heterogeneous software applications running on various machines and devices across different platforms. Applications exchange events via the Event Heap. Each event is characterized by a set of unordered, named fields. Events are routed by matching certain attributes in the fields. The source and target versions of each field are automatically set when an event is posted or used as a template. The Event Heap system implements a unique combination of features, both intrinsic to tuplespaces and specific to the Event Heap, including content based addressing, support for routing patterns, standard routing fields, limited data persistence, query persistence/registration, transparent communication, self-description, flexible typing, logical/physical centralization, portable client API, at most once per source first-in-first-out ordering, and modular restartability.

22 Claims, 15 Drawing Sheets

U.S. PATENT DOCUMENTS

| | | | | |
|---|---|---|---|---|
| 6,751,619 | B1 * | 6/2004 | Rowstron et al. | 707/10 |
| 6,877,107 | B2 * | 4/2005 | Giotta et al. | 714/4 |
| 6,901,441 | B2 * | 5/2005 | Bent et al. | 709/223 |
| 6,915,285 | B2 * | 7/2005 | Gray et al. | 706/49 |
| 7,055,170 | B1 * | 5/2006 | Karmouch et al. | 726/2 |
| 7,269,623 | B2 * | 9/2007 | Neely et al. | 709/205 |
| 7,316,016 | B2 * | 1/2008 | DiFalco | 718/102 |
| 7,469,236 | B2 * | 12/2008 | Gray et al. | 706/14 |
| 7,634,501 | B2 * | 12/2009 | Yabloko | 707/104.1 |
| 2002/0026471 | A1 * | 2/2002 | Bent et al. | 709/101 |
| 2002/0161907 | A1 * | 10/2002 | Moon | 709/230 |
| 2002/0194421 | A1 * | 12/2002 | Berry et al. | 711/100 |
| 2004/0201628 | A1 * | 10/2004 | Johanson et al. | 345/764 |
| 2004/0243663 | A1 * | 12/2004 | Johanson et al. | 709/200 |

OTHER PUBLICATIONS

Johanson, Brad et al., The Event Heap: A Coordination Infrastructure for Interactive Workspaces, pp. 1-13.*

Johanson, Brad et al., The Event Heap: An Enabling Infrastructure for Interactive Workspaces, 2000-02, pp. 1-12.*

Johanson, B et al., "Multibrowsing: Moving web content across multiple displays," Preceedings of UBICOMP 2001, Sep. 30-Oct. 2, 2001.

Peter Tandler, " Softwar infrastructure for ubiquitous computing environments: supporting synchronous collaboration with heterogeneous devices," In: Proceedings of UNICOMSQ2001: Ubiquitous computing Heidelberg: Springer LNCS 2201, 2001, pp. 96-115.

Brad Johanson et al., "The event heap: a coordination infrastructure for interactive workspaces," WMCSA 2002: 83-93.

Brad Johanson et al., " The interactive workspaces project: Experiencs with ubiquitous computing rooms," 2002 IEEE, Apr.-Jun. 2002, Pervasive Computing, pp. 67-74.

* cited by examiner (a) Example of False Match Under Basic Tuplespaces that is Fixed by Typing (b) Example of Flexible Typing Allowing Additional Field Data to be Inserted (c) Example of Field Ordering Causing Mismatch which is Fixed by Flexible Typing

EVENT HEAP: A COORDINATION INFRASTRUCTURE FOR DYNAMIC HETEROGENEOUS APPLICATION INTERACTIONS IN UBIQUITOUS COMPUTING ENVIRONMENTS

CROSS-REFERENCE TO RELATED APPLICATIONS

This application claims priority from a U.S. Provisional Patent Application No. 60/461,520, filed Apr. 8, 2003, and incorporates by reference herein the content and appendices thereof, including computer source code of an embodiment implementing the present invention.

STATEMENT REGARDING FEDERALLY SPONSORED

RESEARCH OR DEVELOPMENT

The United States Government has rights in this invention pursuant to Contract No. W-7405-ENG-48 between the United States Department of Energy and the University of California and Subcontract B504665 between the University of California and Stanford University.

FIELD OF THE INVENTION

The present invention relates generally to interactive workspaces and ubiquitous computing. More particularly, it relates to a new and useful infrastructure for coordinating interactions of heterogeneous software applications running on various machines and devices in ubiquitous computing environments.

DESCRIPTION OF THE BACKGROUND ART

The concept of a tuplespace was first described in 1982 in a programming language called Linda, a coordination language for expressing parallel processing based on generative communication. A tuplespace is a logically shared memory or buffer that contains tuples (data entries). A tuple is a collection of ordered type-value fields, such as (integer 11, integer 8, integer 38), (string "to", string "aa", string "hi", string "ss") or (string "John", integer 38, decimal 156.7). Each tuplespace functions as a "blackboard" visible to all participants (e.g., software entities) in a particular scope.

A tuplespace model provides inter-process coordination via tuplespaces which are accessed associatively. Active software entities, which may be distributed over physically dispersed machines, can communicate to each other by releasing data (a tuple) into a tuplespace. Tuples may be posted to the tuplespace, or read/retrieved from the tuplespace in either a destructive or non-destructive manner. This means that senders generate data for use by others without needing to know which process will consume it, and consumers of data need not know who created it.

Tuples in the tuplespace are accessed by matching some or all the elements of the tuples to values or types presented in a predetermined tuple. More specifically, consumers request tuples using a template tuple whose field values are specified where an exact match is desired and left as wild-cards where values are desired to be retrieved from the matching tuple. When a match is found, the tuplespace infrastructure returns a matching tuple to the requesting process.

The most important language primitives in tuplespaces are 'out' (puts a tuple into the space), 'in' (consume a tuple from the space), and 'read' (copy a tuple from the space), where the 'in' and 'read' operations supply a template tuple that may specify explicit values or wildcards for any tuple fields. FIG. 1 shows an abstract representation of how tuplespaces function. In step (a), a sender places a 'circle type' tuple using 'out', as indicated by (1) and the tuple becomes available in the tuplespace (2). In step (b), a receiver submits a 'read' request for the 'circle type' tuple (3) and the tuplespace returns a copy of the 'circle type' tuple submitted in step (a), as indicated by (4). In step (c), the receiver submits 'in' request for the 'circle type' tuple (5) and the tuplespace returns a copy of the 'circle type' tuple submitted in step (a) and removes the copy in the tuplespace, as indicated by (6).

There are many tuplespace implementations in many languages in various states of development. For example, Sun Microsystems introduced JavaSpaces service specification in October 2000 to provide a distributed persistence and object exchange mechanism for code written in the Java programming language. Objects are written in entries that provide a typed grouping of relevant fields. Using the known two-phase commit model, the JavaSpaces service supports a simple transaction mechanism that allows multiple clients to write new entries, lookup existing entries, and remove entries from the space.

IBM introduced a similar concept via Java-based TSpaces in March 1998. The TSpaces consists of a set of network communication buffers (tuplespaces) and a set of application-programming interfaces (APIs) and classes that implement the API for accessing those buffers. The TSpaces package includes server software that implements the buffers and client software for accessing the buffers. For the client, TSpaces acts as a reminder service, carries out tasks assigned by the client, reports incoming messages and delivers outgoing messages, and notifies the client of events in which the client is interested.

The basic tuplespace model as introduced in Linda was intended to coordinate a set of processes designed to work together as part of a distributed application. In this situation, since no processes are foreign to one another, no heterogeneous application coordination is necessary. As such, implementations of the basic tuplespace model lack support for coordinating heterogeneous application interactions. Even most implementations of extended tuplespace models, such as JavaSpaces or TSpaces, while allowing disparate applications to coordinate, function only for one language, thus making them unsuitable for coordinating applications written in diverse languages for different platforms. For example, both JavaSpaces and Tspaces allow homogeneous applications written in Java to coordinate. This single platform support is only one of many reasons why existing tuplespace implementations are not well suited to coordinate dynamic heterogeneous application interactions in a ubiquitous computing environment. As described herein in a later section, known tuplespace implementations also lack support for many important and/or essential properties that optimize a ubiquitous computing environment.

The term "ubiquitous computing" was coined by Weiser in "The Computer for the $21^{st}$ Century" Scientific American, 1991, 265(3), pp. 66-75. Since then, it is generally understood that the keys to ubiquitous computing include physical integration with the surrounding environment and spontaneous interaction across devices. To date, however, there is no good model for developing applications that allow for the spontaneous interaction. More particularly, currently there is no viable application coordination infrastructure enabling application portability and extensibility in ubiquitous computing rooms.

Accordingly, there is a continuing need for an application interactions coordination infrastructure for a ubiquitous computing room having heterogeneous software applications running on various networked machines and devices across platforms. The present invention addresses this need.

SUMMARY OF THE INVENTION

It is a primary goal of the present invention to provide a technologically enhanced ubiquitous computing room, also called an interactive workspace, with a highly efficient application interactions coordination infrastructure, hereinafter referred to as the Event Heap system.

The Event Heap system is client-server based with tuplespace state stored on the server machine. Individual Event Heap client applications automatically reconnect if the server goes down and is then restarted. This combined with a dedicated web server that handles requests to restart the server minimizes the problems with server failure. The Event Heap system as implemented has a single server machine. One skilled in the art would be able to implement the server across a cluster of machines to insure that failure in some subset of the machines would not cause failure in the system as a whole.

The Event Heap semantics are different from the standard tuplespace. Accordingly, the term "event" is used herein to refer to the tuple-like entities in the Event Heap and the term "tuple" is used to refer to the standard Linda-style tuple. According to the principles of the present application, "events" are employed by software entities/applications to notify other applications in the workspace of an occurrence, or to request other applications to update their state or to perform some task.

The basic event is a tuple implemented with certain mandatory fields. Because flexible typing provides several advantages in the interactive workspace domain, field order and tuple size are omitted in performing matching. This means that fields are always referred to by name and type in the Event Heap system rather than by their index and type as in the standard tuplespace model.

The fields include the 'EventType' field to indicate the type of the event, a 'TimeToLive' field to determine expiration, some fields for routing, and some internal fields to aid in sequencing the events. All fields except for 'TimeToLive' and the internal use only fields are string type fields. This makes events relatively easy to parse for both humans and machines.

The Event Heap provides additional operations to retrieve events beyond the basic destructive and nondestructive read operations in the standard tuplespace model. There are non-blocking versions of the basic calls, and all of the calls accept an array of template events and return an event that matches one or more of these. A 'SnoopEvents' call retrieves all matching events currently in the Event Heap without effecting sequencing. Finally, events can be retrieved using query registration.

One of the highly desired additional capabilities for a tuplespace-based system in an interactive workspace is some means of routing tuples. The Event Heap accomplishes this by implementing standard source and target fields to allow routing to or from individual objects, applications, devices, people, or groups using the Event Heap. More specifically, when events are posted, the source version of each field is automatically set by the Event Heap client code. For example, the 'SourceApplication' field is set to the name of the application. To receive events from that application, receivers match the desired application names in that field.

Further, when an application retrieves using a template, the target version of each field is also automatically set. The 'TargetPerson' field, for example, might get set to 'Bob.' This way, sources can set the 'TargetPerson' field to 'Bob' if they want their event to be picked up only by applications currently being used by 'Bob.' If a source sets nothing to the target fields, they default to being wildcards, which means that the event will be picked up by all receivers that match the rest of the fields correctly. This system allows flexible and standardized point-to-point, multicast and broadcast communication.

To perform sequencing, each source tags every generated event with a Source, a SessionID, and a SequenceNum (sequence number). The Source needs to be unique among all sources participating in the Event Heap, so a random integer is always appended to the name specified by the calling application. If no source name is specified, the application name with a random integer is used instead. The SessionID is chosen randomly every time a source is instantiated, and is used to differentiate between events from before and after an application restart. SequenceNum starts at one and is incremented for each new event of a given type submitted during a given session.

On the receiver side, sequencing is accomplished by keeping track of the most recent event received from any given source. This information is sent with retrieval requests and the server will only send back events that are newer than the most recent one indicated as seen by the receiver. Keeping the receiver specific state on the receivers insures that it isn't lost if the server gets restarted.

Still further functionalities and advantages of the present invention will become apparent to one of ordinary skill in the art upon reading and understanding the detailed description of the preferred embodiments and the drawings illustrating the preferred embodiments disclosed in herein.

DETAILED DESCRIPTION OF THE INVENTION

Figure 1:
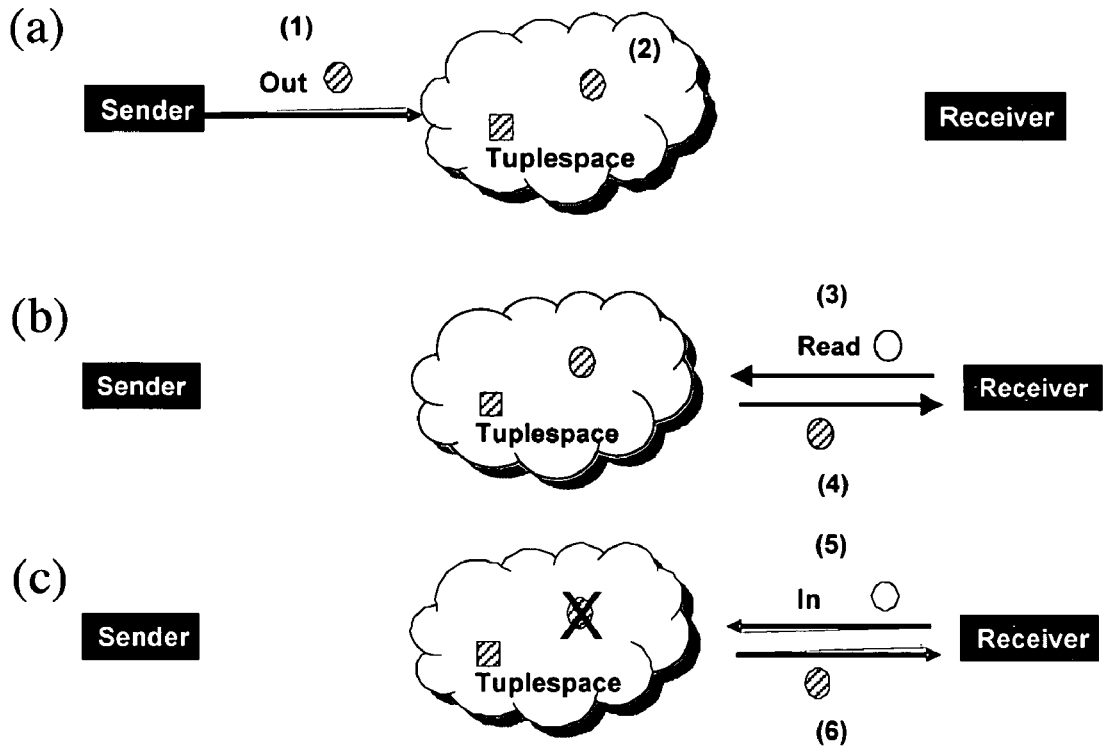
FIG. 1 shows a conventional tuplespace model.
Figure 2:
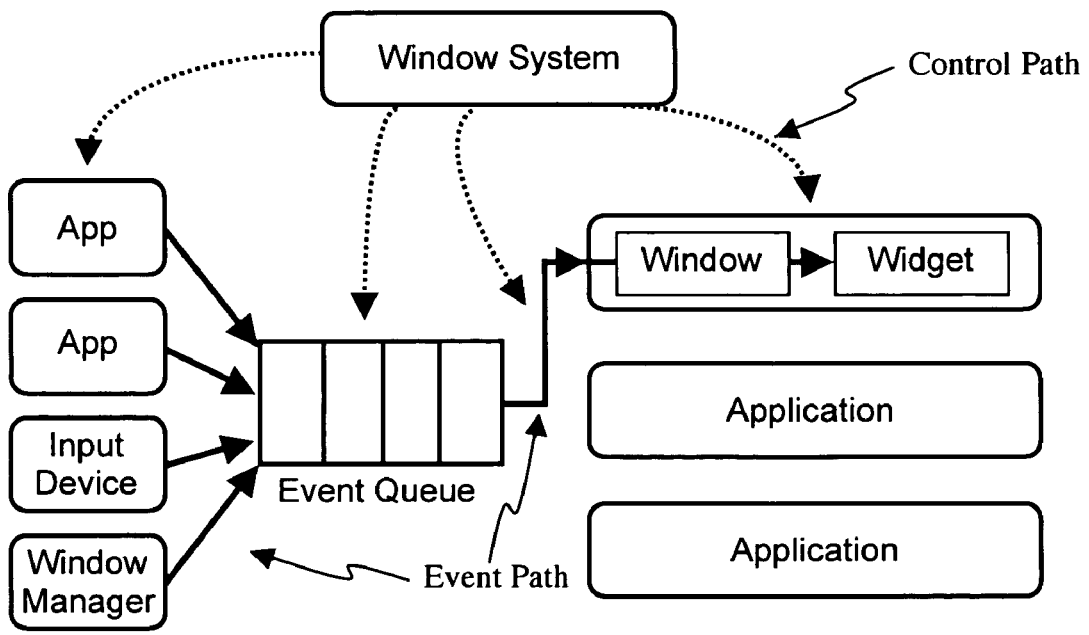
FIG. 2 illustrates a typical event queue for a conventional windowing system.

It is important to understand concretely why a conventional event queue is not appropriate to accomplish the aforementioned goal. FIG. 2 shows a typical event queue for known operating systems such as the Windows® OS. In an event queue system, applications, input devices, and the window manager submit events into the queue. When an event reaches the front of the queue, it is read by whichever application that is currently the target of the queue, usually the application that is in focus. The windowing or operating system explicitly manages the connection of event generators to the queue, the current destination of events in the front of the queue, and the chain of event recipients. The monolithic nature of the queue makes it difficult for the queue to handle multiple distinct users, since only one application is the target of events at any given time.

On the other hand, the Event Heap, a dynamic application interactions coordination infrastructure, is particularly useful in ubiquitous computing (a.k.a. pervasive computing) rooms, interactive workspaces, or smart homes where groups of people come together to meet, collaborate on projects, and/or solving problems.

The Event Heap is described herein with reference to an exemplary interactive workspace called iRoom, a laboratory for ubiquitous computing research at the Stanford University. One skilled in the art will appreciate that the Event Heap can be readily implemented in other interactive workspaces and is not limited to or restricted by the particulars of the iRoom disclosed herein.

Section 1 briefly describes the iRoom and its meta operating system, i.e., the interactive room operating system (iROS). For more information about interactive workspaces, ubiquitous computing, and the iRoom, readers are referred to an article by Brad Johanson, Armando Fox, and Terry Winograd, "The Interactive Workspaces Project: Experiences with Ubiquitous Computing Rooms" Pervasive Computing, April-June 2002, pp. 67-74. Section 1 also discusses users needs and characterizes the interactive workspace from the standpoint of factors that must be taken into account by an application coordination infrastructure in such a space.

Section 2 describes the Event Heap model, an infrastructure for dynamic application interactions coordination in an interactive workspace. The Event Heap model has two parts. The first part comprises a set of properties necessitated by the characteristics laid out in the first section. The second part comprises an extended tuplespace model implemented with distinct features supplying the needed properties.

Section 3 describes a working implementation of the Event Heap model, including an Event Heap client, an Event Heap server, various methods of accessing the Event Heap, and an Event Heap debugger.

1. An Exemplary Interactive Workspace 1.1 The iRoom

Figure 3:
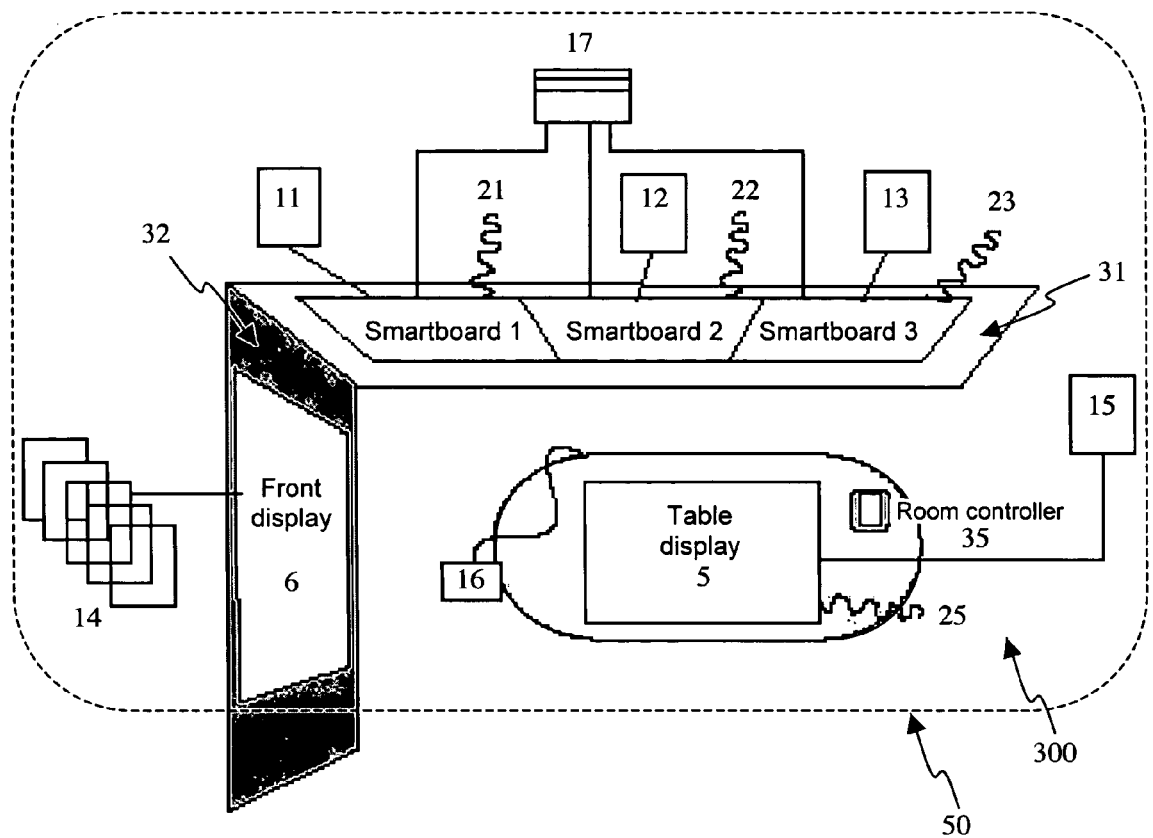
FIG. 3 shows a top view layout of an exemplary interactive ubiquitous computing room embodying the invention.

Currently, few interactive workspaces exist, and those that do are mostly research prototypes in various stages of development. FIG. 3 shows a top view layout of a working interactive workspace known as the iRoom at the Stanford University. The exemplary iRoom 300 has three 6' diagonal back-projected touch-sensitive electronic whiteboards 1, 2, 3. In some embodiments, these are SMART Board™ interactive whiteboards from SMART™ Technologies Inc. of Calgary, Alberta, Canada. The smartboards 1, 2, 3 are mounted on wall 31 adjacent to wall 32, on which a custom 7' diagonal high-resolution 12-projector tiled back-projected front display 6 is mounted.

The iRoom 300 also has a bottom-projected 5' diagonal tabletop display 5. These display devices are driven by a plurality of computers 11-15 running on, for instance, Windows® 2000 operating systems, in a local area network (LAN) 50 having wired as well as wireless connections. A multi-head machine 17 optionally drives the smartboards 1, 2, 3. A laptop source 16 is centrally located to allow for easy and convenient display of video output from a laptop to one of smartboards 1, 2, 3. The LAN 50 also supports wireless connections 21-25 for laptops and hand-held devices with wireless capabilities conforming to standards such as IEEE 802.11b, Bluetooth, and so on. There are a number of additional devices, including cameras (not shown), a ceiling-mounted tabletop scanner system (not shown), and a collection of wireless buttons (not shown).

1.2 The iROS and its Components

The Interactive Room Operating System (iROS), of which the Event Heap is one component, can be best viewed as a meta-operating system or middleware infrastructure, tying together devices within an interactive workspace, each having their own low-level operating system. One instance of iROS runs in each interactive workspace. To coordinate and interact with other devices and applications in the workspace, a new device or application needs to contact the iROS infrastructure running there.

Figure 4:
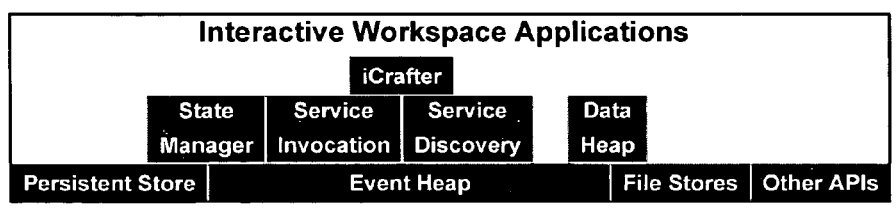
FIG. 4 illustrates the iROS component structure according to an aspect of the invention.

Referring to FIG. 4, the iROS component structure 400 shows how the iROS components fit together. Three iROS sub-systems, Data Heap, iCrafter, and Event Heap, are designed to address three key user needs in an interactive workspace: moving data, moving control, and dynamic application coordination, with the Event Heap also serving as a foundational component for Data Heap and iCrafter. These user needs will be described in more details in the following subsection.

Data Heap—Moving Data

Figure 5:
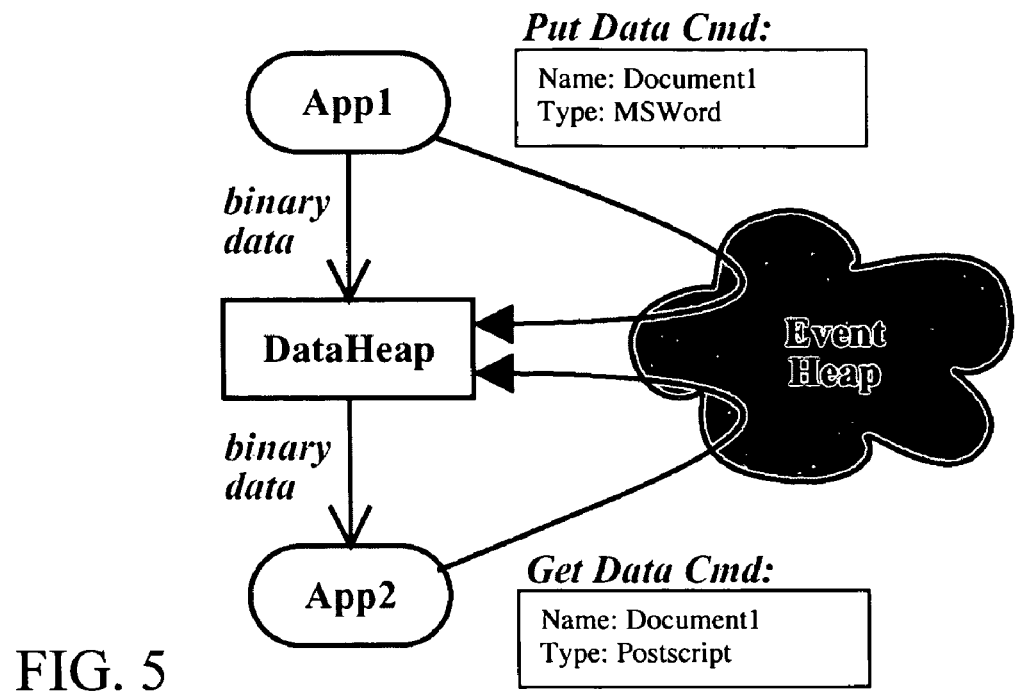
FIG. 5 shows the Data Heap according to an aspect of the invention.

The Data Heap provides a data storage and transportation mechanism to make it easier for applications to move and retrieve data in an interactive workspace. In addition to storage, the Data Heap provides a means to transform data. This functionality can either be used when no application is available to display the data in its native format (e.g. a Photo-Shop® document in an application that only supports JPEG images), or to reformat the data for a device with a different output format (e.g. using speech synthesis to output a text file through a speaker). The basic mechanism of the Data Heap is shown in FIG. 5.

iCrafter—Moving Control

Figure 6A:
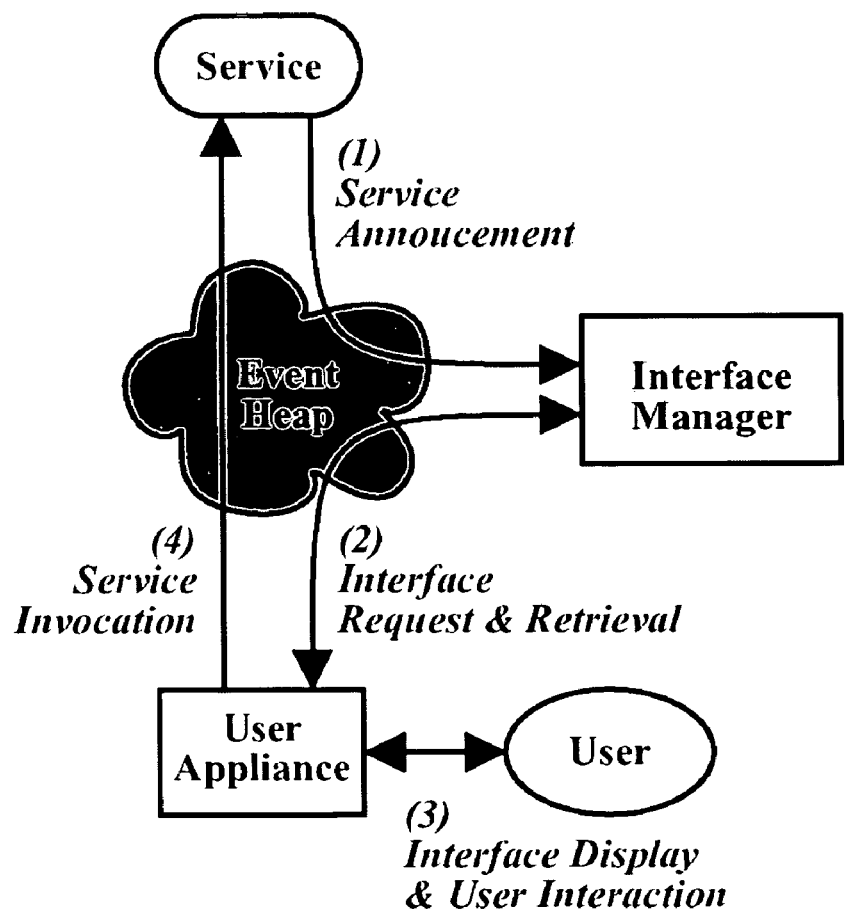
FIG. 6 shows the iCrafter according to an aspect of the invention.

The iCrafter provides service advertisement and invocation, along with a user interface generator for services. FIG. 6A illustrates how the iCrafter framework works. Services periodically beacon their descriptions to the Event Heap with an expiration time set to two times the period (1). This provides a mechanism for devices that are removed or crash to automatically be removed from the list of valid services. Service Descriptions describe the services' programmatic interfaces in an XML-based service description language. iCrafter service descriptions do not include URLs or physical addresses of the services or user interfaces (UIs), because this would require re-mapping whenever service or UI locations change.

When a request for an interface arrives from an appliance (2), the interface manager chooses a custom UI generator if one is available for the service and appliance platform, or a generic service-independent UI generator otherwise. The generators can access a local XML database for the local workspace context information (such as physical locations). When a user performs an action on the user interface (3), the service is invoked by placing an event into the Event Heap (4).

Figure 6B:
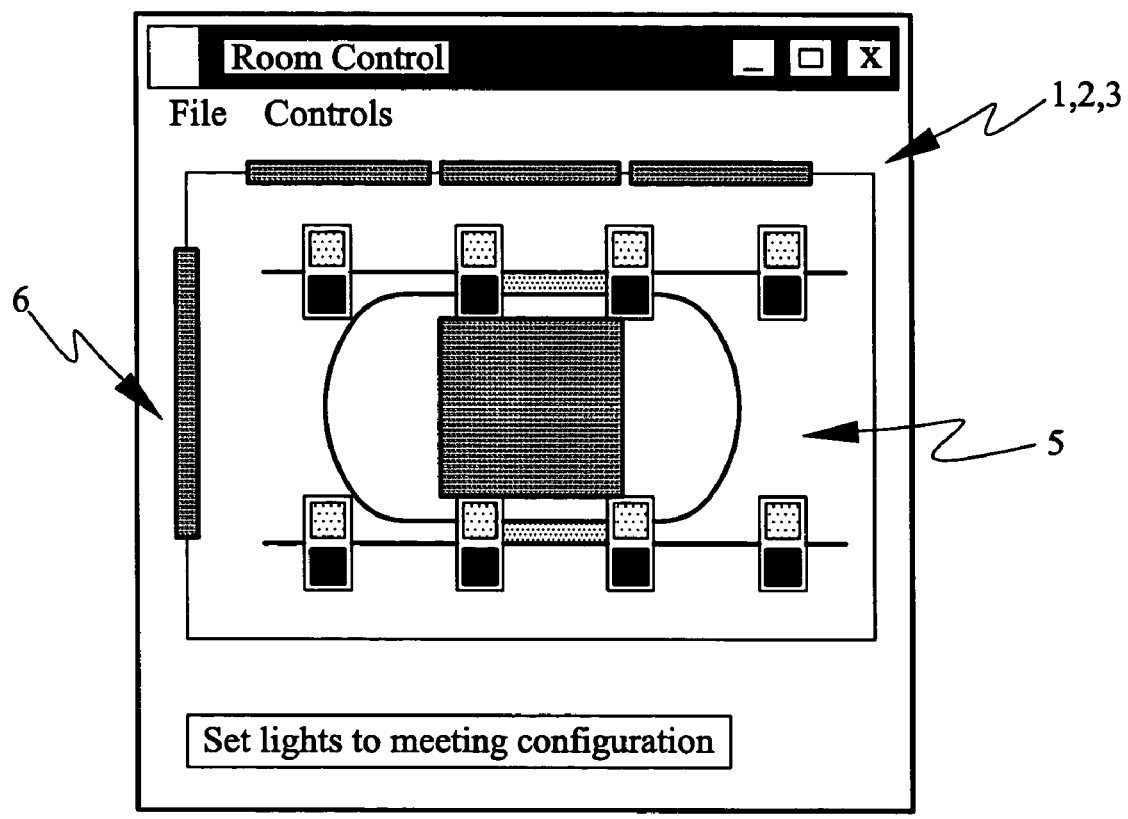
Figure 6C:
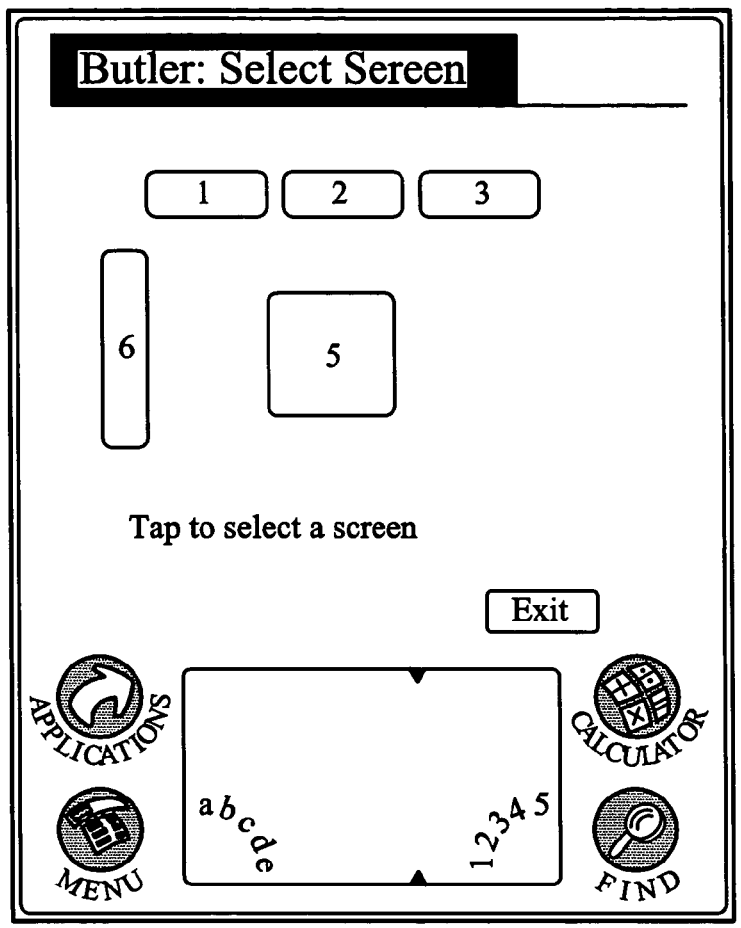
Figure 6D:
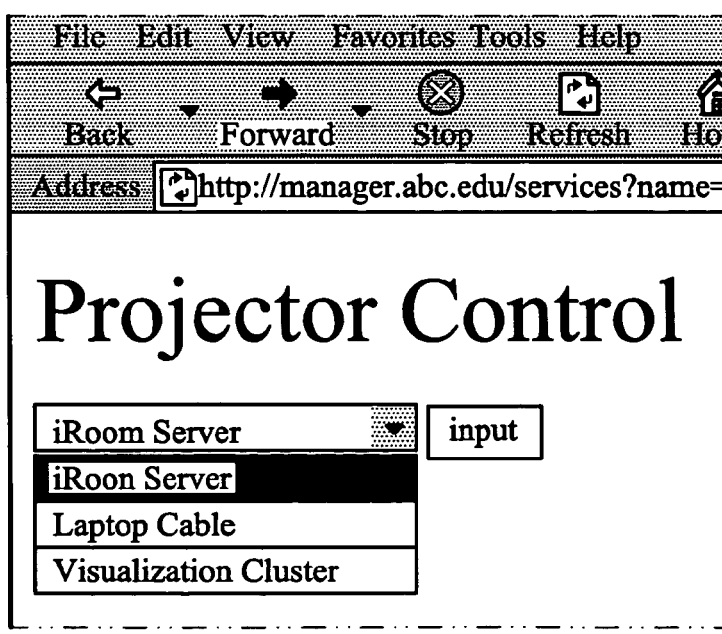

The iCrafter makes moving control easier by providing a standard way to generate a user interface for any device. iCrafter supports a range of interfaces from those that are custom designed to those that are fully generic. An interface manager service provides a list of other services currently available to users of the interactive workspace. For example, if room geometry is available, a light controller can show the actual positions of the lights in a graphical representation of the workspace. One of the most commonly used iCrafter interfaces in the iRoom 300 is the Room Controller 35. It provides a geometric view of the room, the ability to move data to any display in the room, and to control lights, projectors, and routing laptop video to screens. Some of the different Room Controller interfaces generated by iCrafter are shown in FIGS. 6B-6D in which FIG. 6B shows a Java swing version thereof, FIG. 6C shows a Palm OS version thereof, and FIG. 6D shows a web version thereof.

Event Heap—Dynamic Application Coordination

The Event Heap facilitates dynamic application coordination, as well as supplies the underlying communication infrastructure for applications and other system infrastructure such as Data Heap, iCrafter, file store and other APIs. The only component that an iROS program must use is the Event Heap, which is the underlying application coordination and communication infrastructure.

Figure 7:
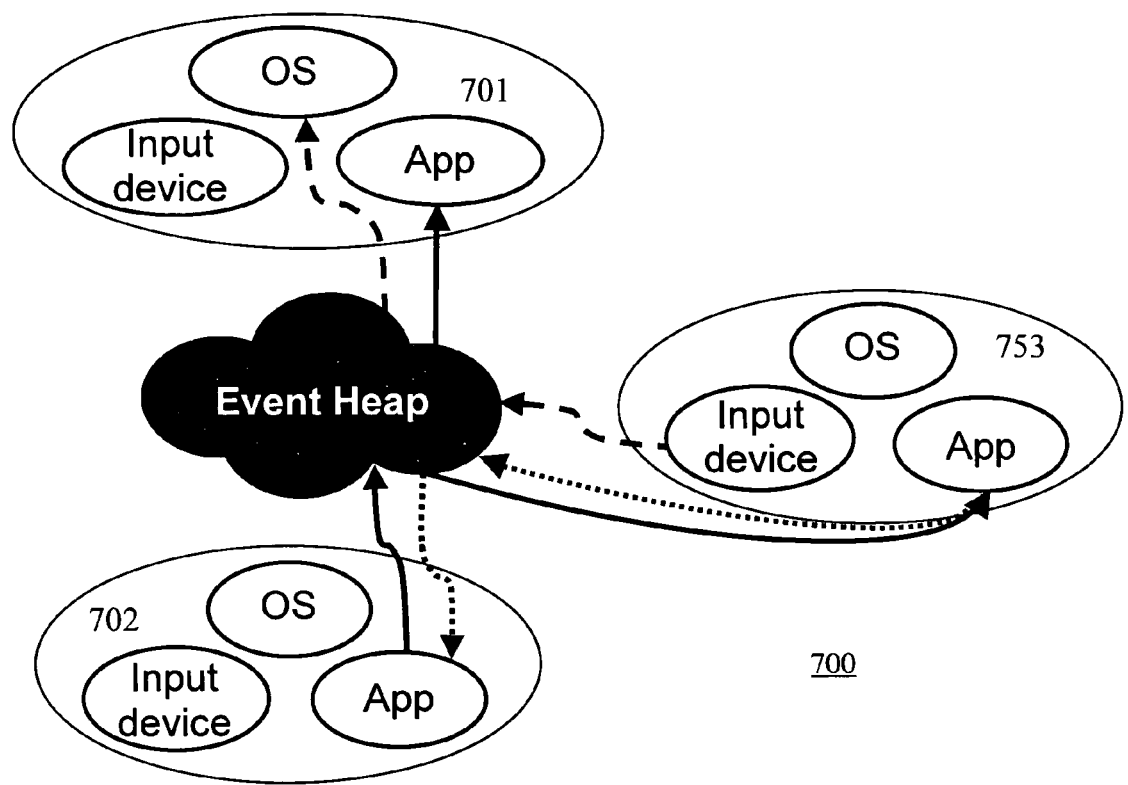
FIG. 7 shows the Event Heap model according to the principles of the present invention.

FIG. 7 shows the Event Heap architecture. Unlike the event queue system shown in FIG. 2, there is no explicit serialized flow of events through the Event Heap system 700. An application on machine 702 can post events to be consumed by other applications on both machine 701 and laptop 753. At the same time, the mouse on the laptop 753 can be controlling the graphical user interface (GUI) of machine 701 by posting a series of mouse events to be consumed by the operating system on machine 701. Finally, there may be a direct exchange of events between the applications on laptop 753 and machine 701. The inherently many-to-many connectivity of the Event Heap allows it to function well in the distributed multi-machine, multi-application, multi-user environment of an interactive workspace. The Event Heap is further described in section 2 below.

1.3 Three Key User Needs

Moving Data

Users in the iRoom need the ability to move data among the various visualization applications that run on screens (displays) in the room as well as on laptops or PDAs that are brought into the iRoom. One important aspect of data movement is the need to provide for both public and private space, as well as a means to transfer information between the two. By allowing these two types of space, users can work privately on something until they feel it is suitable for group viewing, and then transfer it off their personal device onto a communal display in the environment.

Moving Control

In an interactive workspace users no longer sit in front of a single display, so controlling applications and devices becomes more difficult. While it is possible to force people to walk over to each device to control it, this introduces interruptions during meetings. Instead, a means should be provided to allow any device in the workspace to be remotely controlled from any other device. In particular, standard GUI interfaces need a control means to provide mouse and keyboard control.

Dynamic Application Coordination

The specific applications that teams need to display data and analyze scenarios during problem solving sessions are diverse, and any number of these programs may be needed during a single meeting. The activities of each tool should therefore coordinate with others as appropriate. For example, the financial impacts of a design change in a CAD program should automatically show up in a spreadsheet program showing related information running elsewhere in the room. We call this style of interaction dynamic application coordination.

1.4 Characteristics of an Interactive Workspace

An interactive workspace enables a new type of human computer interaction (HCI)—one involving multiple machines and multiple people. With the proliferation of mobile devices and the ability to embed large touch screens in workrooms, interactive workspaces, ubiquitous computing rooms, smart homes, and other device-rich technological environments will soon be common places where groups of people come together to meet, collaborate on projects, and/or solving problems. Table 1 summarizes the characteristics of such places or spaces.

TABLE 1

| Based on Human Factors |
| --- |
| H1. Bounded Environment |
| H2. Human Centered Interaction and Flexible Reconfiguration |
| H3. Human Level Performance Needs |
| Based on Technology Factors |
| Heterogeneity |
| T1. Hardware |
| T2. Software and Software Platforms |
| Changing Environment |
| T3. Short Timescale Change |
| T4. Long Timescale Change (Space evolution) |

The characteristics of interactive workspaces are divided into two categories: those arising from the way humans interact, collaborate, and perceive in a team-project room, and those based on the technology that is likely to be deployed in such spaces. The two are interrelated; for example, interactive workspaces need to provide for user's portable devices entering, engaging and disengaging with ongoing activity in the space. This dynamism arises from both the availability of portable device technology and the way humans use such devices.

1.4.1 The Human Factors

Bounded Environment

An interactive workspace is bounded in physical extent, therefore humans expect devices and applications to coordinate with one another within the space. Similarly, coordination with applications and devices outside of the space should not occur unless a user specifically requests the coordination. Therefore, the software infrastructure for a particular room must only support the devices within the room unless explicitly over-ridden by users to do otherwise. We refer to the bounded nature of an interactive workspace as H1.

From a systems perspective, one challenge of addressing H1 is that traditional networks and administrative domains do not typically conform to architecturally bounded regions such as rooms. Systems that use broadcast on a sub-net to coordinate applications can fail to behave in a fashion users might expect if the sub-net spans several rooms, a floor, or even a whole building.

Wireless networking solutions can also cause problems since there is no simple way to constrain the propagation of the radio waves from a base station to a single room. Any infrastructure for interactive workspaces needs to overcome this scoping problem, even if it is by simply asserting that devices should not be connected to the coordination framework if they are not within the corresponding room or workspace (this method is used in the Event Heap model).

Human-Centered Interaction and Flexible Reconfiguration

Work in team-project rooms is driven by a group of people working through one or more problems. As each project progresses, different tools (devices, applications, etc.) and information may be necessary, and different sub-groups may form to help solving each new problem that arises in the course of collaboration. In standard team-project rooms, this means that the tools at hand are constantly being used in different ways, e.g., whiteboards are erased and written over, flip charts set to different graphs, etc. Therefore, the coordination system needs to support flexible reconfiguration and dynamic coordination of components being used in the space. We refer to the desire to keep interaction centered on humans and the ability to flexibly reconfigure applications and hardware in a workspace as characteristic H2.

Human Performance Constraints

One key constraint for any coordination infrastructure in an interactive workspace is that it should not introduce delays that would impact the smooth flow of users' work. The areas that must be made sufficiently fast include the following four categories:
  1. Input observers (device drivers) can sample fast enough for timing conditions (e.g., the sampling rate of a positioning device is quick enough to appear perceptually smooth).
  2. Output devices can update fast enough for timing conditions (e.g., guaranteed frame rate for visual rendering).
  3. Data can be transmitted between input and output devices fast enough for timing conditions (e.g., may need to send a new set of coordinates, versus sending an entire image for each change).
  4. Computation per observation is fast enough for timing conditions (e.g., pointer draw must take less time than the period between subsequent samples of the mouse position).

There is also a limitation on the number of participants that can meaningfully collaborate within a given room. Most studies have shown that meaningful collaboration is limited to groups of two to fifteen participants. This observation can be used to establish a limit on the number of devices and amount of coordination traffic an infrastructure needs to be able to handle. We refer to the need for system performance to be tailored to human needs as characteristic H3.

1.4.2 The Technology Factors

Heterogeneity

One of the main characteristics of an interactive workspace is the heterogeneity of both devices and software in the space. While it is possible to custom build an interactive workspace and a suite of applications using a standard set of interoperable devices running the same development platform (for example, Java across a set of standard PCs and Windows® CE machines), this precludes evolution of the space to allow integration of new devices, and excludes the possibility of integrating existing applications not built on the platform of choice. We refer to the hardware heterogeneity as characteristic T1.

One of the important reasons to support integration of diverse software platforms is to provide support for legacy applications within an interactive workspace. Working groups within companies rely on complex off-the-shelf software as well as in-house solutions. As one skilled in the art will appreciate, it would be impractical or impossible to rewrite the applications just to make them work in an interactive workspace. It is also important to support integration of products from various vendors, which may all have different development platforms. This provides users with flexibility in the software tools they use to solve problems. Support for different software platforms also means flexibility in choosing the most suitable programming language. Some languages may be better suited for coding of different application types. We refer to the variety of software environments that will be present in an interactive workspace and the need to support them as characteristic T2.

Changing Environment

Another important characteristic of an interactive workspace is the constant change within the space. This change will occur both on short time scales as devices crash and restart or as devices enter and exit the workspace, as well as on longer time scales as the interactive workspace as a whole is continually upgraded and modified.

Short-term change occurs in two main ways. The first is through the entry and exit of portable devices that are brought in by users of the space—the meeting leader abruptly leaving in the scenario from the beginning of the chapter, for example. The applications and capabilities of these devices need to be integrated with other software in the space as smoothly as possible, and their unexpected exit should have no ill effects on the other devices and applications in the workspace (aside from capabilities of that device no longer being accessible). Even in normal operation, "experimental" devices or software often fail unexpectedly and must be recovered; the coordination infrastructure needs to be tolerant of these failures as well. We refer to the characteristic of changing over short time scales as T3.

Long-term change occurs in the evolving layout of the interactive workspace and the complement of devices permanently embedded in the space: as the space is used to solve new problems, obsolete devices are removed, and new technology is brought into the space. A coordination infrastructure must therefore be capable of being adapted to work with new devices and platforms over time, thereby allowing coordination between old and new applications and devices. We refer to the incremental evolution that occurs in interactive workspaces as characteristic T4.

2. The Event Heap Model 2.1 Properties for Coordination Infrastructures

This subsection describes a set of properties crucial for a coordination infrastructure of an interactive workspace. Table 2 provides a summary of these necessary coordination system properties and how they relate to the characteristics discussed in the previous section.

TABLE 2

| System Property | Interactive Workspace Characteristic Supported |
|---|---|
| P1. Limited Temporal Decoupling | Human Level Performance Needs (H3) by allowing data to disappear after their period of relevance is exceeded. Short Timescale Change (T3) by masking transient failure, and by preventing system performance degradation by limiting build-up of tuples. |
| P2. Referential Decoupling | Human Centered Interaction and Flexible Reconfiguration (H2) by minimizing need to hard-wire specific configurations. Short Timescale Change (T3) by discouraging application interdependence, thus minimizing the chances of cascading failures. |
| P3. Extensibility | Human Centered Interaction and Flexible Reconfiguration (H2) by making it easier to integrate diverse applications. Long Timescale Change (T4) by allowing applications to be adapted as workspace evolves. |
| P4. Expressiveness | Human Centered Interaction and Flexible Reconfiguration (H2) by providing for a variety of coordination patterns. Heterogeneous Software and Software Platforms (T2) by providing a variety of coordination patterns that may be needed by legacy software. Long Timescale Change (T4) by providing for new coordination patterns that may be needed for future applications. |
| P5. Simple and Portable Client API | Heterogeneous Hardware (T1) and Heterogeneous Software and Software Platforms (T2) by minimizing effort required to support new hardware and software platforms. Long Timescale Change (T4) by minimizing effort required to support new platforms. |
| P6. Ease of Debugging | Human Centered Interaction and Flexible Reconfiguration (H2) by making it easier to debug user problems. Long Timescale Change (T4) by making it easier to troubleshoot integration of new technology. |
| P7. Perceptual Instantaneity | Human Level Performance Needs (H3). |
| P8. Scalability to Workspace-sized Traffic Loads | Bounded Environment (H1) limits scalability to a single workspace. Human Level Performance Needs (H3) also restricts needed scalability to traffic humans can generate. |
| P9. Failure Tolerance and Recovery | Human Centered Interaction and Flexible Reconfiguration (H2) by minimizing impact of failures on users. Short Timescale Change (T3) by preventing crashes from causing systemic failure and allowing for quick recovery. |
| P10. Application Portability | Human Centered Interaction and Flexible Reconfiguration (H2) by encouraging development of a larger set of applications that can be composed. Long Timescale Change (T4) by providing a broader selection of new applications with which to evolve workspace functionality. |

Limited Temporal Decoupling (P1)

Temporal decoupling allows communication between components that are not simultaneously active. This allows newly-started applications or devices just entering an interactive workspace to react to activity that occurred in the seconds or minutes before they became connected. The exact amount of time will depend on the period of relevance of the information to which the reaction is occurring—a "turn on the lights" message should be ignored after a few seconds while a "current meeting topic" message might be relevant for several minutes.

Temporal decoupling also permits applications that crash and restart to receive communications sent while they were restarting. Temporal decoupling addresses the short-term change (T3) experienced in interactive workspaces.

On the other hand, the system should limit temporal decoupling to a 'relevant' time interval; humans expect an action in one application to trigger side-effects in other applications within a reasonable time, or not at all (H3).

In addition, limiting temporal decoupling solves the problem of unconsumed messages, which if buffered forever would over long periods of time result in an accumulation of messages, system slow down and, eventually, a system crash.

Referential Decoupling (P2)

Referential decoupling allows entities to communicate with one another without naming each other specifically. Coordination systems with this property encourage the design of applications that are minimally interdependent with one another, but that can nonetheless react to one another. One way that referential decoupling is possible is by forcing senders and receivers to only interact through an intermediary. Another is for senders to broadcast messages with attributes, and have receivers select messages for receipt based on attributes rather than on the name of the message source.

Referential decoupling makes it harder to create applications that are tightly interdependent since applications are not programmed to interact according to some pre-defined pattern with pre-specified peers. In other words, applications need not depend on specific knowledge about other applications unless that knowledge is related to the task they are pursuing. This provides for short-term changes in interactive workspaces (T3) since applications are less likely to crash as a result of the disappearance or failure of other applications with which they are being coordinated.

In addition to reducing interdependencies, referential decoupling makes it easier to design applications whose components are location independent. Applications no longer need to send update messages to a specific application on a specific machine, but can instead send the message and have the intermediary route it to the appropriate location, or have the receiving application pick it up independent of location based on the content of the message. This flexibility leads to a coordination infrastructure that is more conducive to the dynamic selection of applications in an ensemble, and is thus better able to support human-centered interaction (H2) in an interactive workspace.

Extensibility (P3)

A coordination system needs to provide extensibility in order to cope with the long-term change and incremental evolution (T4) of interactive workspaces. It must be possible to add functionality and adapt applications to one another with no or minimal modifications, and without having access to their source code. This allows integration of task specific legacy applications for use in an interactive workspace environment, supporting H2.

Some important techniques that should be supported to provide extensibility in a coordination system include:

Snooping: This allows applications to monitor communications between other applications in the system. This technique allows a new program to be integrated with a pre-existing set of applications by having it read and react to messages sent by that set. For example, a smart classroom application suite that allows the professor to coordinate several electronic whiteboards could have an application added on to it that displays the whiteboard state on students laptops.

Interposability: This technique allows an intermediary application to pick up messages from a source, translate them to a new format, and then forward them on to a receiver that only understands the new format. This allows applications that communicate using different message protocols to interact with one another without having to modify either program's code. Interposition as a general technique has been advocated also for traditional operating systems.

Snooping and interposition are specific examples of the more general technique of stream transformation. This technique allows an application to receive messages of several different types that are being sequentially emitted by one or more applications and use the information in those streams to create one or more new message streams. Some important types of transformations include: summarization (a large number of messages are reduced to a stream of fewer messages), interpolation (additional messages are created based on input messages), and stream merging (messages from one or more input streams are combined to create a new output stream).

Expressiveness (P4)

Expressiveness refers to what can be expressed, how easily, and how concisely. An interactive workspace coordination infrastructure and its API should be sufficient to express as many different types of coordination as possible. This need not mean that a separate API call be provided for all potential interactions, but simply that the set of API primitives provided can be used to express a variety of different types of coordination (different routing patterns, synchronous and asynchronous communication, etc.).

This flexibility is needed to provide for integration of legacy applications (T2), which may depend on specific types of coordination or distribution patterns. It also allows applications to be arranged to interact with one another in a variety of ways, which supports more flexible, human-centered interaction (H2). Finally, it allows for long-term change and incremental evolution (T4) of interactive workspaces by making it more likely that future applications and devices can be supported within the framework.

Simple and Portable Client API (P5)

The number of API calls supported, and the amount of code necessary to support the infrastructure in the client libraries should be minimized. The main reason for this is to simplify the task of porting the client infrastructure code. This makes it easier to support the heterogeneous devices in the space (T1), and to support new platforms that may be integrated with an interactive workspace as it evolves (T4). The client libraries also need to be small to insure they will fit on impoverished devices. Simplicity of the API is also important since it minimizes the amount of code that needs to be written to integrate legacy applications (T2).

Note that although this requirement is seemingly in contradiction with P4, which advocates an API that allows many different coordination patterns to be expressed, the two are actually compatible. Just as it is possible, for example, to have a RISC processor with a small number of operations that is fully general in its capability to do computation, it is possible to have a small number of coordination primitives that are sufficient to express a variety of coordination types. This will be discussed in more details later.

Ease of Debugging (P6)

Since the ensembles that arise from human-centered interaction (H2) in an interactive workspace will be composed of applications not necessarily designed to work with one another, the coordination system must be designed to make it easy to figure out and debug interactions. Easy debugging also makes it easier to troubleshoot the integration of new devices and applications into the workspace, and thus support workspace evolution (T4).

Perceptual Instantaneity (P7)

Since the coordination infrastructure is intended to support the interaction of applications with one another as driven by the users of the space (H3), coordination and actions across applications and devices should be perceptually instantaneous for the humans working in the interactive workspace. Studies show that perceptual instantaneity varies from 30 ms to about 1 s of latency depending on the type of action taken by the human, or activity in which the human is participating.

On the other hand, the coordination system for an interactive workspace needs not perform at the level of systems that are used to coordinate distributed computation. In distributed systems, inter-process coordination is the main bottleneck and communication throughput and latencies must be minimized. Relative to these high performance systems, a coordination infrastructure in an interactive workspace can burn cycles and bandwidth to provide for some of the more challenging system properties.

Scalability to Workspace-Sized Traffic Load (P8)

As the coordination system will only work within the bounded environment (H1) of the interactive workspace, the system need only scale to handle the amount of load that can be generated by humans working therein. This load is limited by the number of devices and applications in use by humans, and the rate at which they cause the applications and devices to generate coordination messages (related to H3). The number of humans is limited by social factors, which constrain the total number of participants that can meaningfully work together in a workspace.

We estimate that interactive workspaces of the near future will have on the order of tens to hundreds of devices. We expect that during meetings humans will trigger coordination events on the order of one time per minute through their interaction with applications. On top of this, we expect there to be status updates from devices and applications at a rate of around ten events per device per minute. In aggregate, we therefore expect there to be on the order of tens to hundreds of events per second that the system will need to be able to handle with a latency of less than 100 ms.

Failure Tolerance and Recovery (P9)

In order to be productive, users must not continually be interrupted during collaboration. This means that a failure in one component should not cause other components or the system infrastructure to fail. Unfortunately, even commercial software has bugs which can lead to unexpected failures. Further, although the infrastructure system should be constructed to be robust, it too may fail on occasion. The system therefore needs to assume that failures will be common and provide mechanisms for coping with them. This helps provide for the short-term dynamism (T3) of the workspace. The same mechanisms can support human-centered interaction (H2) by minimizing the impact of disruptions caused by failures on the collaborators in an interactive workspace.

In general, for interactive workspaces to ever become widely deployed they need to "just work." It is not realistic to expect a full-time system administrator to keep a workspace running. Users will treat the devices in interactive workspaces as appliances that shouldn't fail in unexplainable ways. At the same time, many of the devices may be commercial-off-the-shelf (COTS) hardware that are failure prone or were not designed to be integrated with heterogeneous equipment. This means that the coordination infrastructure must ensure that failures in individual applications and devices are non-catastrophic, and must provide for quick recovery, either automatically or by providing a simple set of recovery steps for the users.

Application Portability (P10)

The coordination infrastructure and applications that are built on top of it should be deployable in any interactive workspace running the infrastructure. This property should be inherent in the entire design—nothing about the coordination infrastructure should specifically associate it with one particular interactive workspace. Further, the general programming style suggested by the infrastructure should be designed to discourage writing applications that are closely associated with a single interactive workspace. While it is a sound general design principle to encourage compartmentalization and reuse, encouraging applications to be created independent of any given interactive workspace also leads to a larger selection of applications for use in any given workspace. This in turn gives more options for long-term change and evolution of individual interactive workspaces (T4), and provides a better human-centered experience (H2) by giving users more tools from which to choose during collaborations.

Table 3 shows how the above-described properties (P1-P10) allow the Event Heap to provide for each of the interactive workspace characteristics discussed in the previous section.

TABLE 3

| Interactive Workspace Characteristic | Supporting Properties or Design Decisions |
| --- | --- |
| Based on Human Factors | |
| H1. Bounded Environment | Having one coordination infrastructure per interactive workspace scopes all interactions to that space. |
| | Scalability to Workspace-sized Traffic Loads (P8) is limited by this characteristic. |
| H2. Human Centered Interaction and Flexible Reconfiguration | Referential Decoupling (P2) minimizes need to hard-wire specific configurations. |
| | Extensibility (P3) makes it easier to integrate diverse applications. |
| | Expressiveness (P4) provides for the different coordination patterns that may be needed. |
| | Easy Debugging (P6) makes it easier to debug user problems. |
| | Failure Tolerance and Recovery (P9) minimizes the impact of failures on users. |
| | Application Portability (P10) encourages development of a larger set of applications that can be composed. |
| H3. Human Level Performance Needs | Limited Temporal Decoupling (P1) allows data to disappear after its period of relevance is exceeded. |
| | Perceptual Instantaneity (P7) insures system is fast enough to provide for human performance needs. |
| | Scalability to Workspace-sized Traffic Loads (P8) is limited by the traffic humans can generate. |
| Based on Technology Factors | |
| T1. Hardware Heterogeneity | Simple and Portable Client API (P5) minimizes effort required to support new hardware platforms. |
| T2. Software and Software Platforms Heterogeneity | Expressiveness (P4) provides a variety of coordination patterns that may be needed by legacy software. |
| | Simple and Portable Client API (P5) minimizes effort required to support new software platforms. |
| T3. Short Timescale Change | Limited Temporal Decoupling (P1) masks transient failure, and prevents system performance degradation by limiting build-up of tuples. |

TABLE 3-continued

| Interactive Workspace Characteristic | Supporting Properties or Design Decisions |
|---|---|
| T4. Long Timescale Change (Space evolution) | Referential Decoupling (P2) discourages application interdependence, and minimizes the chances of cascading failures.<br>Failure Tolerance and Recovery (P9) prevents crashes from causing systemic failure and allows for quick recovery.<br>Extensibility (P3) allows applications to be adapted as workspace evolves.<br>Expressiveness (P4) provides coordination patterns that may be needed by future applications.<br>Simple and Portable Client API (P5) minimizes effort required to support future platforms.<br>Easy Debugging (P6) makes it easier to troubleshoot integration of new technology.<br>Application Portability (P10) provides a broader selection of new applications with which to evolve workspace functionality. |

2.2 Basic Tuplespace and Event Heap Features

This subsection describes the features of the Event Heap that cause it to possess the aforementioned properties. Table 4 summarizes the system features, both intrinsic to tuplespaces and specific to the Event Heap, and shows how they relate to the desired system properties P1 through P10. The Event Heap implements a unique combination of features, both intrinsic to tuplespaces and specific to the Event Heap. Asterisks (*) indicate features that are not provided by basic tuplespace implementations.

TABLE 4

| System Feature | System Property Provided or Aided |
|---|---|
| Routing | |
| F1. Content Based Addressing | Referential Decoupling (P2).<br>Expressiveness (P4) by allowing flexible content selection. |
| F2. Support of All Routing Patterns | Expressiveness (P4). |
| F3. Standard Routing Fields* | Extensibility (P3) by encouraging routing compatibility between applications.<br>Application Portability (P10) by insuring that the same fields are used for routing in different interactive workspaces. |
| Persistence | |
| F4. Limited Data Persistence* | Limited Temporal Decoupling (P1).<br>Failure Tolerance and Recovery (P9) by preventing tuple buildup that could lead to system instability. |
| F5. Query Persistence/Registration* | Extensibility (P3) by making it possible to reliably snoop on communication.<br>Easy Debugging (P6) by enabling snooping to monitor application interactions.<br>Expressiveness (P4) by allowing guaranteed tuple receipt. |
| Communication Transparency | |
| F6. Transparent Communication | Extensibility (P3) by enabling snooping, interposition and stream transformation.<br>Easy Debugging (P6) by enabling monitoring of application interactions. |
| F7. Self-describing* | Extensibility (P3) by allowing existing applications to be more easily integrated with new ones.<br>Easy Debugging (P6) by making it easier for humans to understand inter-application communications.<br>Application Portability (P10) by allowing reverse engineering of applications to integrate them in new environments. |
| F8. Flexible Typing* | Application Portability (P10) by allowing additional fields to be added to events without breaking other applications.<br>Extensibility (P3) in a similar fashion to P10. |

TABLE 4-continued

| System Feature | System Property Provided or Aided |
| --- | --- |
| Distribution of Infrastructure | |
| F9. Logically Centralized | Limited Temporal Decoupling (P1).<br>Referential Decoupling (P2).<br>Becomes feasible because Scalability to Workspace-sized Traffic Loads (P8) limits traffic to that which can be generated by devices in a single workspace. |
| F10. Physically Centralized | Simple and Portable Client API (P5) by reducing client code overhead.<br>Perceptual Instantaneity (P7) relaxes performance constraints that might make the bottleneck of a centralized system intolerable.<br>Becomes feasible because Scalability to Workspace-sized Traffic Loads (P8) limits traffic to that which can be generated by devices in a single workspace. |
| Infrastructure API | |
| F11. Simple API | Simple and Portable Client API (P5). |
| F12. General API | Extensibility (P3) by permitting arbitrary coordination code.<br>Expressiveness (P4). |
| Ordering | |
| F13. At Most Once, Per Source FIFO* | Extensibility (P3) by not requiring special application code for ordering. |
| Failure Tolerance | |
| F14. Modular Restartability* | Failure Tolerance and Recovery (P9). |

Routing

Routing involves the aspects of a coordination system that determine how a message gets from a sender to a receiver. This involves addressing (how senders and receivers are determined), whether senders or receivers determine routing, what routing patterns are supported, and whether message transmission is push or pull based.

For addressing, sources and recipients may be specified either explicitly, or logically through a level of indirection. Tuplespaces provide logical routing through the use of content based addressing—message delivery is determined by the matching of attributes in tuple fields, with neither sender nor receiver specifying one another. We refer to content based addressing as feature F1. It provides referential decoupling, one of the needed system properties (P2). In addition, content based routing provides a more expressive way for receivers to choose tuples of interest since they can receive tuples based on arbitrary combinations of field values (supporting property P4). In tuplespace systems, content based routing is combined with receiver based routing, which means that receivers determine which content they will get.

The Event Heap supports the following routing patterns:

Unicast (Point-to-Point): Send a message from a sender to a specific receiver. Accomplished in tuplespaces by having a receiver match for a specific value in a tuple field indicating that it is the recipient and then doing either a destructive 'in' call, or a non-destructive 'read' call.

Broadcast (One-to-all): Send a message from a sender to all receivers. Accomplished in tuplespaces by having all receivers match on a special broadcast value in a standard tuple field and doing a non-destructive 'read' call.

Multicast (One-to-N): Send a message from a sender to a group of receivers. Accomplished in tuplespaces by having all receivers in the group match on a special value representing the group in a standard tuple field and doing a non-destructive 'read' call.

Anycast (One-to-exactly-one-other): Send a message from a sender to exactly one of a collection of possible receivers. This is useful for submitting messages that need to be processed exactly once by one of several valid receivers. Accomplished in tuplespaces by having all receivers in the group of valid receivers match on a special tuple field value representing the group, and doing a destructive 'in' call so that only the first recipient to match will see the tuple.

The ability to support all of the different routing patterns is referred to as feature F2. This feature makes the underlying API more expressive (property P4), allowing many types of coordination to be programmed in the system. It also allows coordination at the application level to mimic the patterns used among humans, i.e., one-to-one, one-to-many, many-to-many, and many-to-one.

Persistence

Data persistence ensures that messages don not disappear immediately after their creation. This is provided by tuplespaces, since tuples are maintained in the tuplespace until a receiver performs the destructive removal operation 'in.' This full persistence provides temporal decoupling (P1) of processes or applications using the tuplespace, since the recipient need not be running at the time the tuple is created. We identified limited temporal decoupling (therefore limited persistence) as the desired property, however, and traditional tuplespaces provide no way of 'expiring' unconsumed tuples after their period of utility is over. Together with this expiration feature, the system as a whole has limited data persistence, which we call feature F4.

Query persistence (F5) provides a similar guarantee for requests to receive messages. In receiver-routed systems, the recipient specifies messages to receive, in the case of tuplespaces by providing a template that a candidate tuple must match before it is received. If that 'query' is allowed to persist, the system can ensure that a receiver gets a copy of all messages that match the query. In tuplespaces, there is no query persistence—the template is passed as an argument to the retrieval call and is forgotten by the system as soon as the request is satisfied. This is known as a 'pull' or polling based system, while systems with query persistence are 'push' based systems. The absence of query persistence means that tuples that are placed and deleted between two polls from an application will not be seen by the polling application, making it difficult or impossible to write debugging (P6), logging and snooping (P3) applications. The Event Heap supports query persistence to allow for these important types of applications.

As a beneficial side effect, allowing query persistence also reduces network overhead, since 'pull' based systems require a complete round-trip over the network for each tuple retrieved—the request must be sent to the server and the result returned. With query persistence, one request to the server suffices for the return of all future matching events until the query is removed.

Transparency vs. Opacity of Communication

Transparency of communication is the degree to which applications using the system infrastructure are able to observe and to some degree interpret communications among other entities. Tuplespaces are transparent since all posted tuples may be seen by all participating applications until they are removed. (Applications cannot determine, however, which applications receive copies of any given tuple). We refer transparent communication as feature F6. Providing transparency makes a system more extensible (P3) by allowing snooping and interposition, and makes it easier to debug (P6) the system by observing communications.

The richness of the data format and the opacity of the format (i.e., how easy it is to perform introspection on a message) also affect communication transparency. The basic tuplespace model provides a relatively simple data format: tuples contain an ordered set of fields, each with a primitive type and value—no nesting of tuples is permitted. Therefore, tuples with the same number of fields and field order but different semantic meanings for fields cannot be disambiguated (e.g., a tuple with a single integer field whose value specifies a page number is indistinguishable from one whose integer field specifies a file descriptor number). The Event Heap's flexible typing feature overcomes this drawback.

Format opacity refers to how difficult it is for a party that knows nothing about a message to determine its contents. A message format with destination and a payload of bytes is completely opaque, while one that provides information on semantic meaning in addition to the content is relatively transparent. Tuplespaces provide limited transparency: any application that retrieves a tuple may determine the number of fields, field types and field content, but the tuple as a whole is not typed or named, nor are individual fields named, so it is not straightforward to determine the meaning of the tuple or fields unless one is an intended recipient of a message. The Event Heap's self-describing feature addresses this deficiency.

Distribution of Infrastructure

Another design consideration takes into account to what extent the infrastructure is centralized or decentralized. The basic tuplespace model is logically centralized, with a central space that is used to exchange tuples. This logical centralization, which we call feature F9, makes it easier to keep applications referentially and temporally decoupled (P1 and P2), since the system can act as a proxy between senders and receivers. Logical centralization does, however, reduce the scalability of the system (i.e., Internet scale coordination through a logically centralized infrastructure would not be feasible). This is not an issue for the iRoom because, due to P8, we only need the system to scale enough to support the devices in a single workspace.

In some embodiments, the Event Heap system is physically centralized with a server machine hosting the event heap. We refer to this physical centralization as feature F10. This feature is similar to known tuplespace implementations such as JavaSpaces and TSpaces. While physically centralizing limits total system throughput and the scalability of a system, with modern processors and networks the performance of such a centralized implementation is more than adequate for the tens or hundreds of devices and applications that can be expected to be in use during group collaborations in an interactive workspace.

By physically centralizing the system, the implementation can also be concentrated in the server, making the client software simpler (P5). This makes it easier to port the client API to new platforms. Although physical centralization creates a single point of failure, several techniques exist to distribute the tuplespace across several machines such that a cluster could be used instead of a single server. Further, the Event Heap's temporal decoupling combined with the soft state mechanism to regenerate data across Event Heap server failures allows the Event Heap system to tolerate most transient failures even without a distributed implementation.

Infrastructure API

The Event Heap model has a very simple API (P5) with six functions to express the coordination ('in', 'out', 'read', non-blocking versions of the two read operators, and an 'eval' function which can be used to launch new processes). This makes it easy to port the system to new platforms. In addition, a simple API makes it simpler to add wrappers to existing application's programmatic interfaces when source code is unavailable, a critical ability in the integration of legacy applications. We refer to this simple API as feature F11, although a simple API doesn't necessarily imply a simple implementation.

Another important design characteristic of the API is its generality. We refer to the generality of the API as feature F12. Some suggest that coordination languages (what we have been calling the API of our coordination infrastructure) should be thought of as orthogonal to computational languages. Each coordination language provides a set of primitives that can be used in any computation language. Some coordination languages are 'general purpose' and can be used to express any type of coordination (analogous to a computational language being Turing-complete). This generality provides for portability to new platforms and for heterogeneity. In terms of systems properties, it also means that the Event Heap is extensible (P3) and expressive (P4) since any type of coordination can be expressed using F12.

Self-Describing

One problem with using a conventional tuplespace model in an interactive workspace is that the semantic meaning of a field in a tuple is known only to the programmer who programmed the processes using the standard tuplespace. This makes it difficult to reverse engineer tuple communication to integrate new applications with an existing collection of cooperating applications. This problem can be avoided by making the fields "self-describing", i.e., by adding a string containing a name to the type and value for each field. We call this feature F7, since it contributes to communication transparency (F6).

With self-description, a field can be called, for example, 'Xpos' if it contains the x position for the data being represented by the tuple. Combined with flexible typing, self-description makes it more likely that new developers extending an existing application can infer the meaning of an event and write applications to emit and react to the event. This provides for additional extensibility (P3) and improves application portability (P10). Finally, it also makes it easier to debug the system by simplifying the monitoring of traffic in the tuplespace (P6).

Flexible Typing

Figure 8:
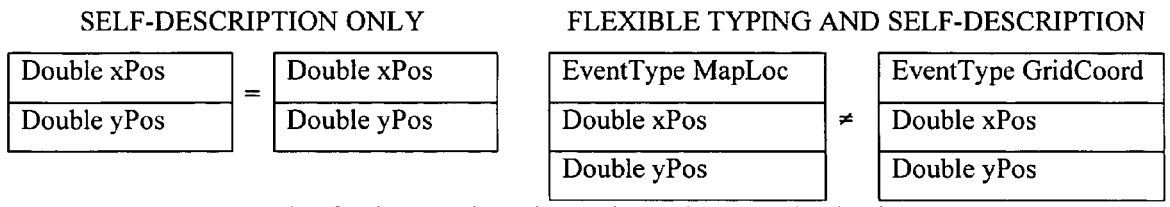
FIG. 8 compares self-description vs. self-description combined with flexible typing.
Figure 8:
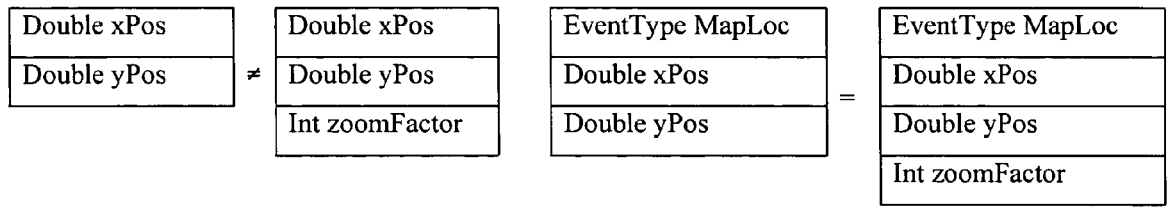
Figure 8:
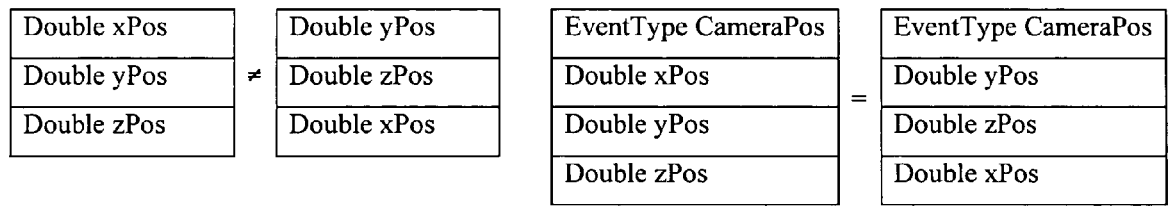

In a parallel application, the programmer or programmers can determine in advance standard formats and meanings for the tuples that will be exchanged. In an interactive workspace, applications developed separately might choose events of the same size and field order, but with different semantics, causing erratic behavior when collisions occur. These problems can be solved by the introduction of flexible typing, which we refer to as feature F8. FIG. 8 exemplifies some of the problems that can arise by showing the differences between matching in a basic tuplespace extended only with self-description, and matching in a tuplespace with both flexible typing and self-description. Symbol '=' indicates where tuples will match if values match and symbol '≠' indicates where tuples cannot match.

Typing is accomplished by adding a special tuple type field (or event type in the case of the Event Heap) whose value determines the minimal set of fields required for this tuple type and the meanings of each of these required fields. With typing, applications need only avoid collisions on the name of this type, which solves the semantic collision problem for the majority of the cases, as shown in FIG. 8(a), and provides for application portability to new spaces (P10).

By making tuple typing 'flexible', newer applications are allowed to use an enhanced version of a tuple while maintaining interoperability with older applications. Specifically, matching can be changed to ignore field order and allow matching to any tuple that has a superset of the template's fields, as shown in FIG. 8(b). Thus, newer applications can add fields with supplemental information without breaking compatibility, thereby making the system extensible (P3).

Standard Routing Fields

While the standard tuplespace model supports all of the routing patterns (one-to-one, one-to-all, etc.), individual application developers must have a convention for which tuple fields are set to determine their routing. This works well for parallel applications with processes designed to work together. In the 'open' tuplespace environment of an interactive workspace, however, a standard for fields is needed to insure a compatible routing mechanism between all applications. This in turn enhances the extensibility of the system (P3) and provides better application portability (P10). We call the addition of standard routing fields feature F3.

With the standard routing fields extension, the Event Heap client implementation tags the source fields of posted tuples with information about the source and the target fields of template tuples with information about the querying receiver. By default, the target fields are set to wildcards on senders, allowing the event to be routed to any receiver, and source fields are set to wildcards on receivers so they match events from any source. By overriding the target values of an event sent from a source, an application programmer can route the event to a specific target instead of all targets, and by overriding the source values used by a receiver the programmer can select only events from a specific source rather than events from all sources.

As an example, to send to all '3DViewer' applications, a sender can set the 'TargetApplication' field on an event to '3DViewer.' Since the client-side of the infrastructure sets the 'TargetApplication' field of template events on all 3DViewer applications to '3DViewer,' the event will only be picked up by 3DViewer applications (although only by those that would otherwise match the event which was sent). If an event is sent without the application writer overriding the value of 'TargetApplication' field, that field will be sent out set to a wildcard value and will therefore match all receivers looking for an event that otherwise matches the one being sent.

Figure 9A:
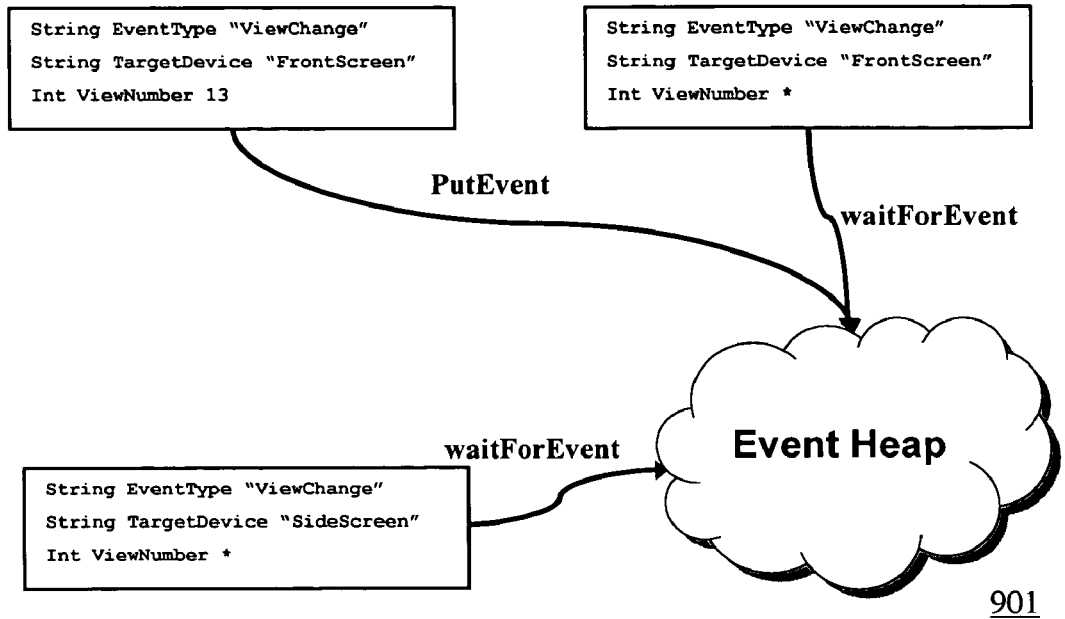
FIGS. 9A-9B exemplfy the Event Heap standard routing fields.
Figure 9A:
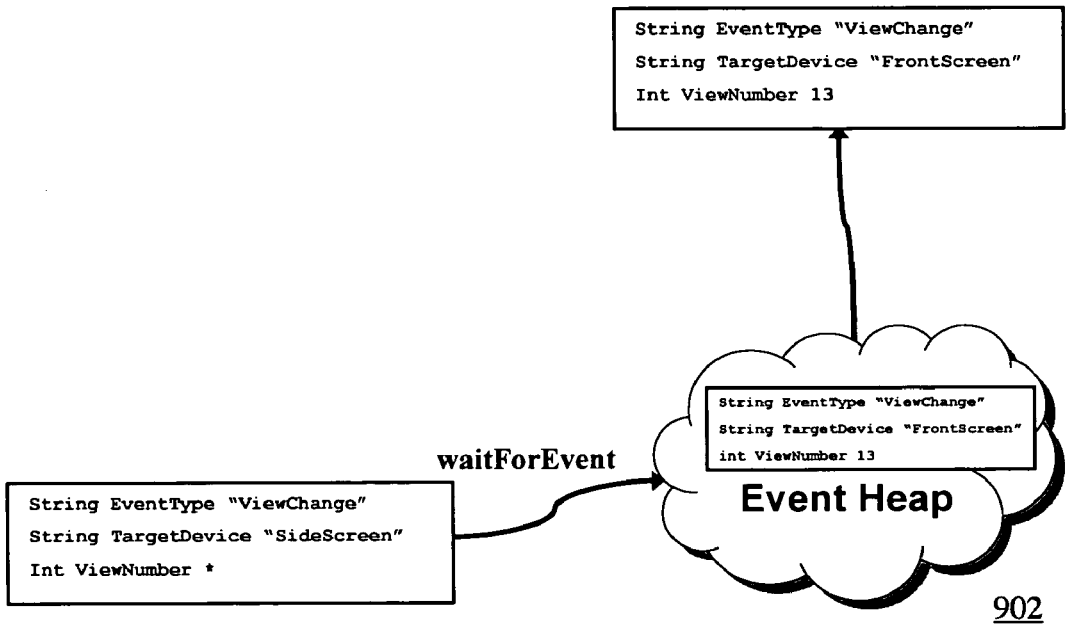
Figure 9B:
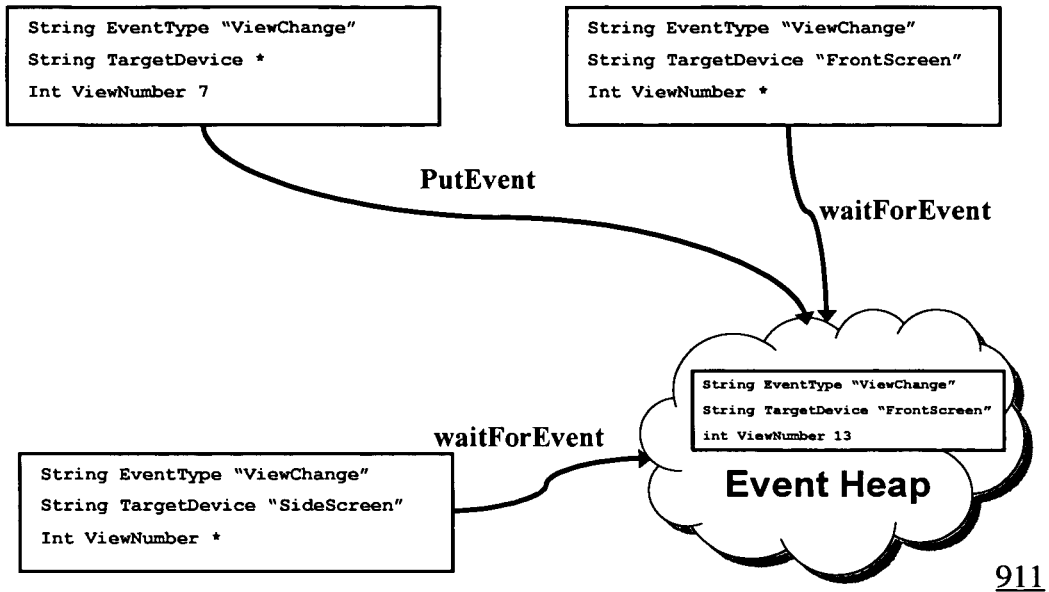
Figure 9B:
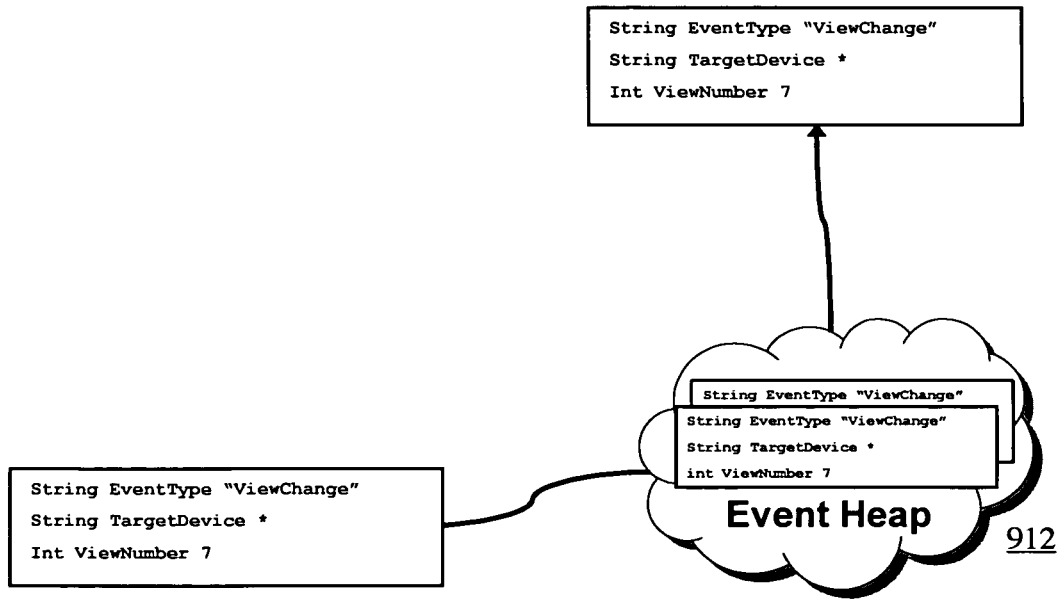

The Event Heap supports routing by program instance, application name, device, person, group or any combination of these. FIGS. 9A-9B together gives another example of using the Event Heap standard routing fields to either send to a specific screen, or multicast to all screens. In step 901, a client (source) places an event for "FrontScreen" while two other clients block. In step 902, the client that was waiting for "FrontScreen" receives a copy of the event. Later, a source sends an event to all screens (displays). In step 911, a client (source) places an event for any target device, indicated by the asterisk (*) wildcard character, while two other clients block. In step 912, both blocking clients match on target device and receive a copy of the event.

Event Expiration

The standard tuplespace model provides temporal decoupling, but not the limited temporal decoupling we had specified as a desirable system property. In an interactive workspace, there is no guarantee that a tuple posted by an application will ever be consumed (e.g., perhaps the intended recipient has crashed or is not functioning). As such, if tuples do not expire, they can build up in the tuplespace, leading to the eventual exhaustion of server resources and crash of the server software. This leads the system to be more failure prone, the opposite of property P9.

In the Event Heap, each event has an expiration field, which gives the system limited temporal decoupling (P1). The expiration field also allows each event to have an expiration period proportional to the time over which it would appear reasonable to users of the room to see a causal effect of that event. Event expiration along with the data persistence provides the limited data persistence feature (F4).

Query Persistence/Registration

Another drawback of the basic tuplespace model is that it only supports polling. This means that tuples placed into the tuplespace and removed between successive polls by a process will not be seen by that process. In the controlled environment of a parallel application using a tuplespace, this race condition can be avoided by careful programming, but in an interactive workspace with a diverse collection of applications it cannot be. The problem would be worse with limited temporal decoupling since events may simply expire before they are polled.

The solution is to allow a query to be registered with the coordination system. The query persists until it is deregistered, and for as long as it persists, a copy of each posted event which matches the registered template is returned to the querying application by a notification call.

Query registration and persistence (F5) make the system easier to debug (P6) since trace applications can log all tuples placed into the tuplespace. It also improves extensibility (P3) since it allows snooping applications to spy on and react to communications even between applications that perform destructive reads of tuples. The overall expressiveness of the system (P4) is also improved since this type of guaranteed receipt is not possible with standard tuplespaces.

FIFO, at Most Once Ordering

Conventional tuplespaces provide no guarantee of the order in which tuples are returned by a series of identical queries. This has a strong negative impact on applications for an interactive workspace. In practice, most applications perform a loop retrieving tuples that match some particular schema, and then performing some action based on the contents of the retrieved tuple. To allow other applications to react to the same tuple (which in turn permits multi-cast routing), applications by default perform a non-destructive read. On the next call in the loop, however, the same tuple may be retrieved again since it will still be a valid match to the template. In order to not react twice to the same tuple, code must be written to track which tuples the application seen, which adds development overhead. The problem of duplicate retrieval is known as the multiple read problem.

Having applications perform destructive reads reduces extensibility of the system, which detracts from P3. Since most applications use this feature, and we want to maintain extensibility, it is desirable to add per-source FIFO, at most once, ordering, or some stricter ordering, to any extended tuplespace system intended for an interactive workspace. We call this feature F13, and adding it ensures that each event will be seen at most once, and the oldest unseen event from a source will always be returned before newer unseen events.

For the Event Heap, exactly once delivery is only provided if query registration is used, otherwise, since events may expire before they are retrieved by a given application, only at most once delivery can be provided. To our knowledge, no tuplespace system or application of tuplespace systems has needed stronger than per-source ordering (such as total causal ordering). On the other hand, the Event Heap implementation provides total ordering to most applications as a side effect of having a physically centralized server-based implementation.

The FIFO, at most once ordering, provides basic order and delivery functionality to the Event Heap. For applications that require more advanced delivery semantics such as transactions, guaranteed delivery and consistent views of data, a higher level API could be built on top of the Event Heap.

Modular Restartability

An important feature for the interactive workspace is modular restartability (F14), which assures that any application or even a component of the central infrastructure can be restarted without causing failure in other components. In the Event Heap implementation, the client side API is designed to automatically reconnect should the server go down and later restart. The server itself was, of course, also programmed such that crashing clients do not affect it.

This feature allows users to restart client applications at will, restart the server after a crash, or bring up a new version of the server software without having to restart client applications running on the various machines in the iRoom. Modular restartability is not included in the original tuplespace model since in most parallel applications all processes need to run to completion to solve the problem. Thus, in convention tuplespace implementations, failure in one always required a restart of the whole system. Modular restartability helps support property P9.

Table 5 summarizes how the above-described Event Heap features provide the Event Heap model with the aforementioned properties in an interactive workspace. As in Table 4, asterisked (*) features are not provided by basic tuplespace implementations.

TABLE 5

| System Property | Features that Help Provide Property |
|---|---|
| P1. Limited Temporal Decoupling | Limited Data Persistence (F4*).<br>Logical Centralization (F9) provides central location to buffer data when neither coordinating application is running. |
| P2. Referential Decoupling | Content Based Addressing (F1) provides routing mechanism that doesn't require coupling.<br>Logical Centralization (F9) provides an intermediary to decouple coordinating applications. |
| P3. Extensibility | Standard Routing Fields (F3*) encourages routing compatibility between applications.<br>Query Persistence/Registration (F5*) makes it possible to reliably snoop on communication.<br>Transparent Communication (F6) enables snooping, interposition, and other types of stream transformation.<br>Self-describing Events (F7*) allow existing applications to be more easily integrated with new ones.<br>Flexibly Typed Events (F8*) allow additional fields to be added without breaking other applications.<br>General API (F12) permits arbitrary coordination code.<br>At Most Once, Per Source FIFO Ordering(F13*) insures the same technique for ordering is used for all applications. |
| P4. Expressiveness | Content Based Addressing (F1) allows flexible content selection.<br>Support of All Routing Patterns (F2).<br>Query Persistence/Registration (F5*) allows receipt of all events during registration period.<br>General API (F12) allows expression of any type of coordination. |
| P5. Simple and Portable Client API | Physical Centralization (F10) reduces the amount of infrastructure code on clients.<br>Simple API (F11). |
| P6. Easy Debugging | Query Persistence/Registration (F5*) enables snooping to monitor and debug application interactions.<br>Transparent Communication (F6) enables monitoring and debugging of application interactions.<br>Self-describing Tuples (F7*) make it easier for humans to understand inter-application communications. |
| P7. Perceptual Instantaneity | Makes performance constraints achievable using a Physically Centralized (F10) implementation. |
| P8. Scalability to | Limits traffic which needs to be handled by Logically Centralized |

TABLE 5-continued

| System Property | Features that Help Provide Property |
|---|---|
| Workspace-sized Traffic Loads | (F9) and Physically Centralized (F10) implementation. |
| P9. Failure Tolerance and Recovery | Limited Data Persistence (F4*) prevents event buildup that could lead to system instability. |
| | Modular Restartability (F14*) insures that transient server failures or other component failures don't impact the system as a whole. |
| P10. Application Portability | Standard Routing Fields (F3*) insure that the same fields are used for routing in different interactive workspaces. |
| | Self-describing Events (F7*) allow easier reverse engineering for integration of applications in new environments. |
| | Flexibly Typed Eventss (F8*) allow additional fields to be added without breaking older applications. |

2.3 Dynamic Application Coordination

The Event Heap model provides for dynamic application coordination in the following way: applications listen for events to which they know how to respond, and emit events as users interact. Since the applications don't listen for events from any specific source, nor do they send out events to a specific destination, the applications interact which whichever other applications are currently running in the interactive workspace and using the same set of events. In an example of calendar applications, each source would post date change events whenever the date is changed within that application and listen for date change events from other applications.

This type of interaction is analogous to how humans interact within a room—even when divided into sub-groups, all conversation is audible, and any given person can choose to respond to something they hear. Thus, even though no formal interaction mechanism has been defined for the people in the room, they are able to coordinate their activities with one another. Similarly, applications "speaking" the same event types can coordinate with one another even though no specific mappings between the applications has been established.

3. A Working Example of the Event Heap Model

The term 'Event Heap' hereinafter refers to the implementation and the term 'Event Heap model' refers to the model. Both the reference Event Heap client and Event Heap server are implemented from scratch in Java using only libraries that are part of the Java platform (JDK). Client versions supporting C++, Python and several other languages have also been implemented. One skilled in the art will recognize that it is possible to implement the Event Heap model in additional computer languages, e.g., C#.

The Event Heap implements all the features (F1-F14) and therefore has the properties (P1-P10). In some cases, implementation details directly affect the degree to which certain properties are satisfied. For example, failure tolerance (P9) and modular restartability (F14) are supported by implementing auto-reconnection for clients.

3.1 Event Description

The event is the basic unit of discourse with other applications using the same Event Heap server. Each event consists of a set of unordered, named fields. Since fields are unordered, they are always referenced by name instead of by index within the event. One special field with the name 'EventType' identifies the intended meaning of the event and a minimal set of additional fields is included to provide for the flexible typing feature (F8).

Field Structure

Each field contains the following:

Type: The type for this field. Several platform independent types such int, float, and string are supported. Platform dependent types may also be used, but will only be accessible for the given platform.

Name: The name of this field. It is intended to convey the meaning of the values contained in the field. This gives the implementation the self-description feature (F7).

Post Value: The value for this field when it is posted to the Event Heap server. The post value is used for comparison when a template event is compared to a posted event.

Template Value: The value for the field when the event is used as a template. This value is used to compare against the post values of events posted to the Event Heap when the event is sent to the server as a template.

Permitted Field Values

Values within each field may either be an actual value of the same type as the field (for example, "Hello, World!" if the field is of string type), or the value can be marked as one of several special types. The first of these is 'formal.' A 'formal' value matches any other actual or formal value when comparing events. The next special type is 'virtual' which indicates that the field should be ignored (treated as not existing) when this value is used in a match. Using 'virtual' allows extra optional fields be included when declaring Event Types without worrying about how they might complicate matching.

Two more special types are only used in conjunction with the routing fields discussed before.

Neither of these values may be used by application developers for custom fields. The first type is 'auto-set.' Values with this type are automatically set by the Event Heap client code whenever the event is posted to the Event Heap server or used as a template to retrieve events from the server. If an application changes the auto-set value to something else, the Event Heap client will overwrite it when the event is used. The second special-type used for the routing fields is 'auto-set overrideable.' The only difference between this value type and 'auto-set' is that the user may apply their own value to the field and the Event Heap client will no longer automatically set it when the event is used. Table 6 provides a summary of the different value types that may be applied to the post and template values within a field.

TABLE 6

| Value Type | Meaning |
|---|---|
| Actual | This is a real value of the type for the field. |
| Formal | The value is a wildcard and matches any other value. |
| Virtual | Treat the field as not existing. |
| Auto-set | Value will be set by Event Heap Client. |
| Auto-set Overrideable | Value will be set by Event Heap Client if not set by the application. |

Event Matching

Events are returned to clients by the server only if they are determined to match the template event specified by the client. We will call the template event TE and the candidate matching event CE. Once TE and CE are selected, matching proceeds according to the following rules:
1. CE only matches TE if they have the same string value for the 'EventType' field.
2. All fields that have a 'Virtual' post value in CE are ignored/discarded.
3. All fields that have a 'Virtual' template value in TE are ignored/discarded.
4. All fields of TE must have a field in CE with the same name and type. Call these fields $TE_n$ and $CE_n$.
5. The post value of each $CE_n$ must match the template value of $TE_n$.
6. Post values match template values if:
   a. One or the other is 'Formal'; or
   b. They are both 'Actual' and contain the same value according to equivalence semantics for that type.

TE matches CE if and only if all of the matching rules hold true. Note that the matching rules allow template events to match candidates that contain a super-set of their fields in order to satisfy the flexible typing feature (F8). A corollary to this is that TE matching CE does not imply that CE would match TE (if CE has a super-set of the fields of TE, then when CE is used as a template to match against TE, TE will not have all of the needed fields to be able to match). Thus, matching is not commutative.

'Formal' values may be used in both posted events and template events. When 'formal' values are used in a field of a posted event, that field will match any value requested by a receiver. Conversely, when 'formal' values are used in a field of a template event, that field will match any value posted by a sender.

Standard Fields

All events have certain standard fields, some of which are optional. The fields fall into three general categories: required user fields, routing fields, and internal use fields. The aforementioned 'EventType' field is a user field, so is the 'TimeToLive' field. The 'TimeToLive' field is used by the application to specify how many milliseconds the event should be kept on the Event Heap server before it is expired. This helps provide for the limited data persistence feature (F4).

The routing fields control event receipt according to five different attributes: application instance, application name, device name, person, and group. The fields come in pairs, with a source version and a target version for each attribute (for example, 'SourceDevice' and 'TargetDevice'). All of them are automatically set for users by the Event Heap client library, but can be overridden. Application instance, application name, and device name are always present, while person and group are normally 'virtual,' but can be used if the application sets the person and group with the Event Heap client software.

The internal use fields are for handling certain bookkeeping tasks and include 'SessionID,' 'SequenceNum,' and 'EventHeapVersion.' The first two are used for insuring at most once, FIFO ordering of events (F13). 'EventHeap Version' specifies the version of the event format and is used by the server to determine which standard fields should be present. It is primarily intended to accommodate potential future changes to the set of standard fields.

3.2 Event Heap Client API

The Event Heap client API is used by application developers in writing their applications. Table 7 summarizes the main Event Heap client API calls, and provides the equivalent Linda-style tuplespace call where applicable.

TABLE 7

| API Call | Linda Equivalent | Description |
|---|---|---|
| Server Connection Calls | | |
| new EventHeap(machine, port) | N/A | Connect to an Event Heap Server |
| Event Posting Calls | | |
| void putEvent(Event) | void out(tuple) | Place an event onto the server. |
| Event Retrieval Calls | | |
| Event[ ] getEvent(Event[ ]) | tuple rdp(tuple) | Retrieve a copy of an event from server |
| Event[ ] waitForEvent(Event[ ]) | tuple rd(tuple) | Blocking version of getEvent |
| Event[ ] removeEvent(Event[ ]) | tuple inp(tuple) | Read and delete and event from the server |
| Event[ ] waitToRemoveEvent(Event[ ]) | tuple in(tuple) | Blocking version of removeEvent |
| Event[ ] snoopEvents(Event[ ]) | N/A | Retrieve copies of all matching events from the server, ignoring ordering |
| Event[ ] getAll(void) | N/A | Retrieve copies of all events on the server, ignoring ordering |

TABLE 7-continued

| API Call | Linda Equivalent | Description |
|---|---|---|
| Query Registration Calls | | |
| Registration registerForEvents(Event [ ], Callback) | N/A | Register to receive copies of any future matching events placed on the server |
| Registration registerForAll(Callback) | N/A | Register to receive copies of all future events placed on the server |
| void Registration.deregister(void) | N/A | Cancel a previous registration |
| Other | | |
| void deleteEvent(Event) | N/A | Delete an event from the server that was previously retrieved |
| void clear(void) | N/A | Delete all events currently on the server |

Connecting to an Event Heap Server

One Event Heap server is intended to be run for each interactive workspace. Clients connect to the server by instantiating an Event Heap object. During instantiation, the machine and port of the Event Heap server are specified. For the duration of the Event Heap object, all API calls are addressed to that server. By having one Event Heap per interactive workspace, the scope of the coordination infrastructure is made to match the users perception of the physical extent of the room. This is designed to account for the bounded environment characteristic of interactive workspaces (H1).

Posting Events

The 'putEvent' call places the event passed to it into the Event Heap. This is equivalent to the 'out' call in standard tuplespaces. The client sets all of the auto-set fields before sending the event to the Event Heap server. Any fields that have both post and template values set to 'virtual' are stripped from the event before transmission to minimize overhead in sending the event over the wire.

Event Retrieval

There are six API calls for retrieving events from the Event Heap server. Four of the calls, 'getEvent,' 'waitForEvent,' 'removeEvent,' and 'waitToRemoveEvent,' return a single matching event. Each of these takes an array of template events and returns the oldest unseen event on the server that matches one or more of the templates. They also return the set of templates that successfully matched to aid the client in dispatching the returned event.

The 'getEvent' and 'waitForEvent' calls return a copy of the event, leaving the original on the server for other applications to retrieve, with the latter blocking until a matching event becomes available if no matching event is on the server at the time of the call. They are equivalent to the non-blocking and blocking versions, respectively, of the tuplespace 'read' operator.

The 'removeEvent' and 'waitToRemoveEvent' calls are the destructive versions of the previous two calls, with the latter being the blocking version. With these calls, the original event is deleted from the server before being returned to the client. These calls are equivalent to the non-blocking and blocking versions, respectively, of the tuplespace 'in' operator.

The remaining two calls, 'snoopEvents' and 'getAll,' return collections of events. Unlike the previous four calls, both ignore ordering, so it is possible that previously seen events will be in the returned sets. The 'snoopEvents' call takes an array of template events and returns a copy of all events on the server at the time of the call that match one or more of the template events. It is most useful for detecting current state, for example if beacons are being used. The 'getAll' call is similar to 'snoopEvents,' except that a copy of all events on the server is returned. It is useful for getting a snapshot of the state of the Event Heap. The set of matching templates is not returned for either of these calls because there would be no clear mapping between the set of matching templates and the set of returned events.

Query Registration

The three query registration methods, 'registerForEvents,' 'registerForAll,' and 'deregister' allow applications to register interest in events and receive a callback with each matching event that is placed onto the Event Heap. This gives the implementation the query persistence/registration feature (F5).

To register for some events, the 'registerForEvents' call is used. An array of template events and a callback function are passed to the method. Anytime new events matching one or more of the templates are placed onto the server, a copy of the event is returned to the client Event Heap code. That code then calls the registered function, passing it the matching event along with the templates that were valid matches. When registration is used, only events placed after the registration are returned to the application—even if matching events are on the Event Heap server at the time of registration.

The 'registerForAll' call is similar to 'registerForEvents,' except that no template events are passed to it, and all events placed onto the Event Heap server will be returned. This call is useful for logging or monitoring all events being sent through the Event Heap server.

Both the 'registerForEvents' and 'registerForAll' calls return a handle to a registration object.

The object has a single call, 'deregister,' which cancels the registration. After 'deregister' is called no further callbacks will be received for that registration.

Other Server-side Calls

There are two additional calls that allow interaction with the server, 'deleteEvent' and 'clear.' The 'deleteEvent' call is passed an event that was previously retrieved from the server and causes it to be removed from the server (if it is still present). The 'clear' call removes all events currently on the server, and is intended primarily for administrators. In the future, we plan to protect this call so that only applications with sufficient privileges may call it.

Miscellaneous Local Calls

There are a few client API calls that only effect the state of the local Event Heap client. The first set of calls are accessors for the variables the Event Heap client uses to set the routing fields for both post and template events (TE). They obtain the current value of instance name, application name, device name, group name, and person name. The value of group name and person name can be set any time by the application. Instance, application and device names are either set automatically or explicitly when the application first instantiates an Event Heap object and connects to the server and cannot be changed after that.

Another three of these calls control a local debug printing system. One of these sets the current debug level, which controls the detail level of the debug information, being printed out. Another, 'debugPrintln,' is a replacement for 'printf' or 'println' that can be used in Event Heap applications to print out debugging statements. It is passed a severity level so that, depending on the current level of detail being printed out, the statement will either be printed or suppressed. A final call allows the output stream for all debug statements to be redirected from the normal standard error. This can be used to direct statements into a debug window, for example. The Event Heap model may optionally include a mechanism for room administrators to remotely re-route the debug streams so that they can monitor all Event Heap enabled applications running in an interactive workspace.

There are also additional informational calls to retrieve the machine and port of the Event Heap server to which the application is connected, and the version of the Event Heap client API. A final call allows a timeout for the blocking server calls to be specified. 3.3 Auto-Set Fields for Routing As mentioned before, one of the desired additional capabilities for a tuplespace-based system in an Interactive Workspaces is some means of routing tuples (feature F3). The Event Heap accomplishes this by providing the standard source and target fields as described above, and then having the client code automatically set them when an event is posted or used as a template.

This works as follows: when events are posted, the source version of each field is automatically set by the Event Heap client code. For example, the 'SourceApplication' field is set to the name of the application. Receivers can then match on certain application names in that field to receive events from that application.

When an application retrieves using a template, the target version of each field is also automatically set (these fields have the 'auto-set overrideable' value, so clients may choose to set the values such that they receive events targeted at others). The 'TargetPerson' field, for example, might get set to 'Bob.' Sources can then set the 'TargetPerson' field to 'Bob' if they want their event to only be picked up by applications currently being used by 'Bob.'

If a source does not set the target fields, they default to formal, which means the event will be picked up by all receivers that match the rest of the fields correctly. Similarly, if a receiver does not set the source fields, they also default to formal, and the receiver will pick up all events that match the rest of the template field values that were specified.

To make the automatic routing fields function properly, the Event Heap implementation uses the 'auto-set' and 'auto-set overrideable' field values described herein. The post-values for the source versions of the fields (e.g. 'SourceDevice', 'SourceApplication,'etc.) all have the 'auto-set' value and cannot be overridden. This insures that developers may not spoof their identity by overwriting the values in these fields. The target fields (e.g. 'TargetDevice,' 'TargetApplication,' etc.) and the template values of the source fields are all set to 'auto-set overrideable' so that the auto-set feature will be disabled when an application explicitly sets the field values. This allows sending applications to set the target fields to route their events to specific targets, and receiving applications to select specific senders from which to receive events. Further, receiving applications can override their target fields to receive events intended for others, which provides one of the mechanisms required for creating intermediary applications.

Overall, the automatic-routing mechanism and the associated fields allow flexible and standardized point-to-point, multicast and broadcast communication for applications using the Event Heap.

3.4 The Event Heap Client and the Event Heap Server

In this example, the Event Heap is implemented as a client-server system. The server and reference client are both written using the Java 2 platform. There are also clients for other languages and other paths to access the events on the Event Heap server machine.

Event Heap Wire Protocol

As discussed in section 1, one of the main characteristics of interactive workspaces is heterogeneity of hardware and software from various platforms (T1 and T2). In addition to providing support for that heterogeneity, some restrictions must be made—the device must be able to communicate with other devices in the workspace. The minimal functionality needed for a device or platform to have Event Heap functionality is socket support for TCP/IP communication.

The Event Heap implementation has a well-defined TCP/IP socket-level wire protocol, which defines all interactions with the Event Heap server. There are two main parts of the wire protocol. The first is a specification of how commands, event collections and sequencing information can be sent over a socket connection in a package called a WireBundle. The second is a list of WireBundle commands that can be sent to the server along with what information needs to be packaged into the bundle with each command. There is also a specification of what can be expected to be returned by the server for each command. Essentially there is one WireBundle command for every client API call previously discussed.

A notable feature of the Event Heap wire protocol is that it is fully asynchronous. Commands sent via wire bundles to the server do not, in general, receive an immediate reply, and multiple sent commands may receive responses out of order. Details of how this works in practice will be made clear in the next two subsections on the client and server implementations.

Client Design and Functionality

Figure 10A:
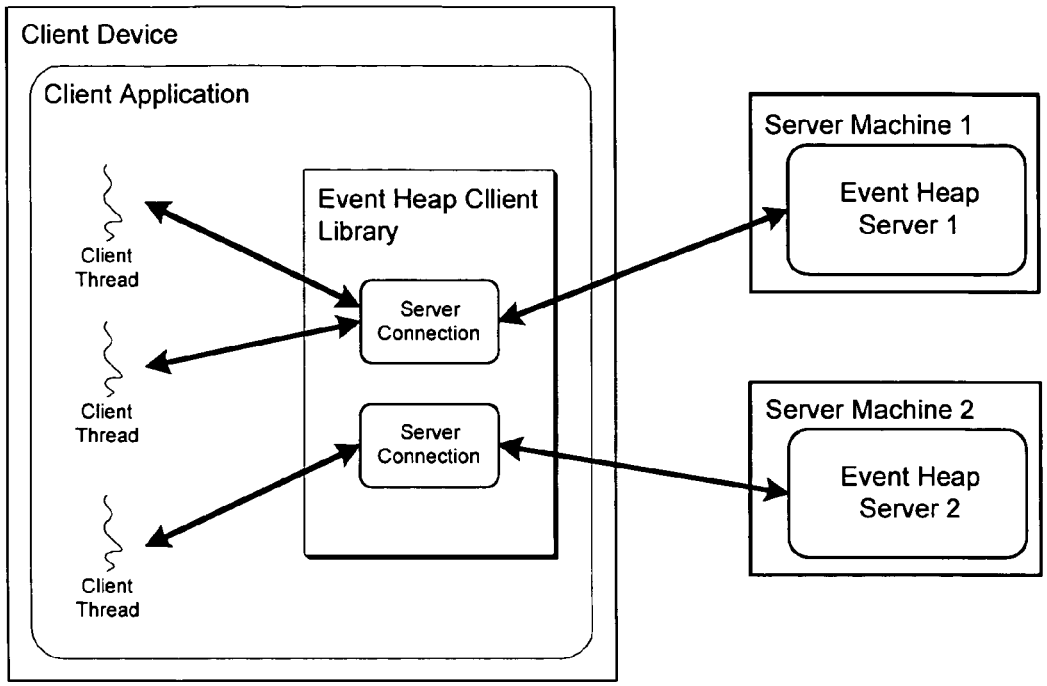
FIGS. 10A-10B illustrate an embodiment of the Event Heap Client.

The Java Event Heap client sends and receives events on behalf of the client application. It also handles setting the auto-set fields in posted events, or events used as templates. An overview of the Event Heap client is shown in FIG. 10A.

The basic operation is as follows. Whenever a thread in the client application creates a new EventHeap object (thus requesting a connection to some specific Event Heap server), the list of current server connections is checked. If no connection exists to the server, a new server connection object is created and connected to the requested Event Heap server. If a connection already exists, the new object shares the connection with other EventHeap objects connected to the same server. When a thread in the client application makes an Event Heap client API call that needs to access the server, the server connection object serializes the events, creates the appropriate WireBundle object and sends it to the server. When the returned event or events arrive it passes them back to the client thread.

Figure 10B:
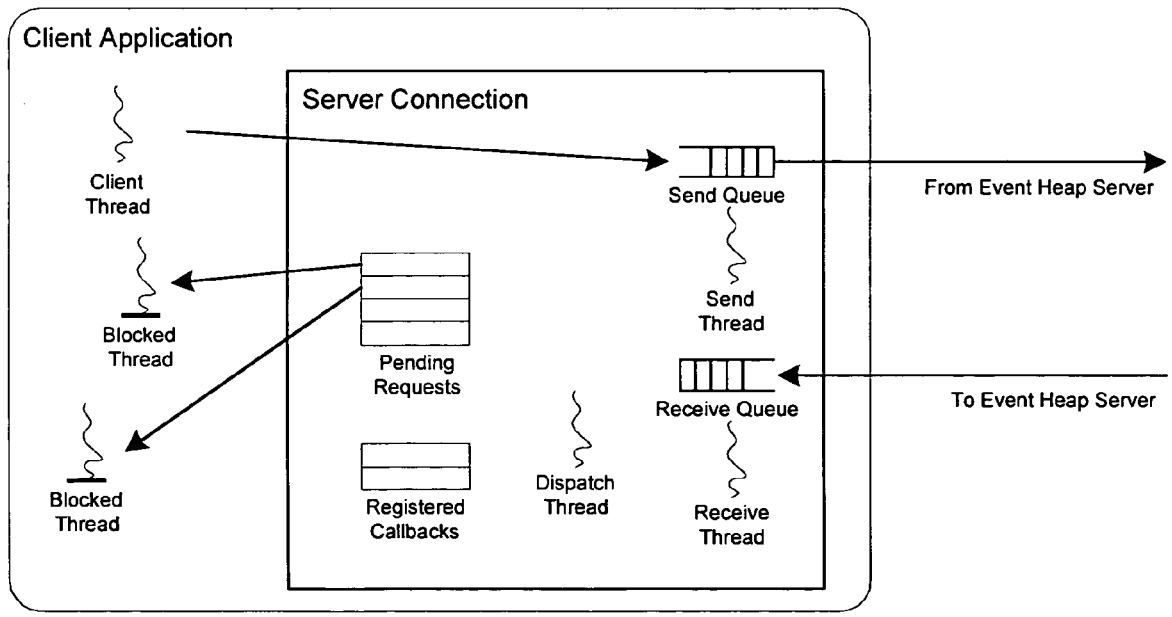

FIG. 10B shows in more detail how each server connection object works for the Event Heap Client. Each server connection object has both a send and receive queue. Requests to the server from client threads are packaged into a WireBundle then placed into a send queue. A send thread forwards the WireBundles in the send queue out to the server over the socket connection as fast as possible. For all non-registration calls, the calling thread is blocked and a reference to the blocked thread is stored in a hash table using an ID for the request as a key. For registration calls, the callback is stored in a table of registered callbacks hashed by an ID for that registration, and control is returned to the calling thread.

On the receiving side, a receive thread reads returned WireBundles off the socket connection and places them into a receive queue. A dispatch thread processes WireBundles from the front of the queue and determines based on the return ID whether or not the returned result is for a registration. If it is for a registration, the appropriate callback is looked up in the table and the callback is invoked with the events in the WireBundle. For all other cases, the calling thread is looked up in the blocked threads table, and control is returned to the thread. For requests returning events, the events are returned. In the case of 'putEvent,' 'deleteEvent,' and 'clear,' only an ACK is returned from the server, so control flow is returned to the calling thread with no results.

In all cases, whether the return is coming via registration or a normal polling call, if only one matching event is being returned, the server returns that event alone and does not return the set of templates that successfully matched. This saves the bandwidth of returning template events that are already available on the client, and saves the server the processing cycles that would be needed to determine if more than one template was a match. Instead, the client compares the returned event with the templates passed in the original call and returns the set of matching templates to the blocked thread or as arguments to the callback.

An important feature of the client is that it automatically reconnects. If the server is found to be down when a client thread makes a call, the client code continually tries to reconnect to the server, and completes the request when it succeeds. The current implementation waits randomly between zero and two seconds between retry requests to avoid taking too many CPU cycles. A client API call lets developers specify a timeout so they can regain control if the server stays down for too long. This provides the modular restartability feature (F14).

Server Design and Functionality

Figure 11:
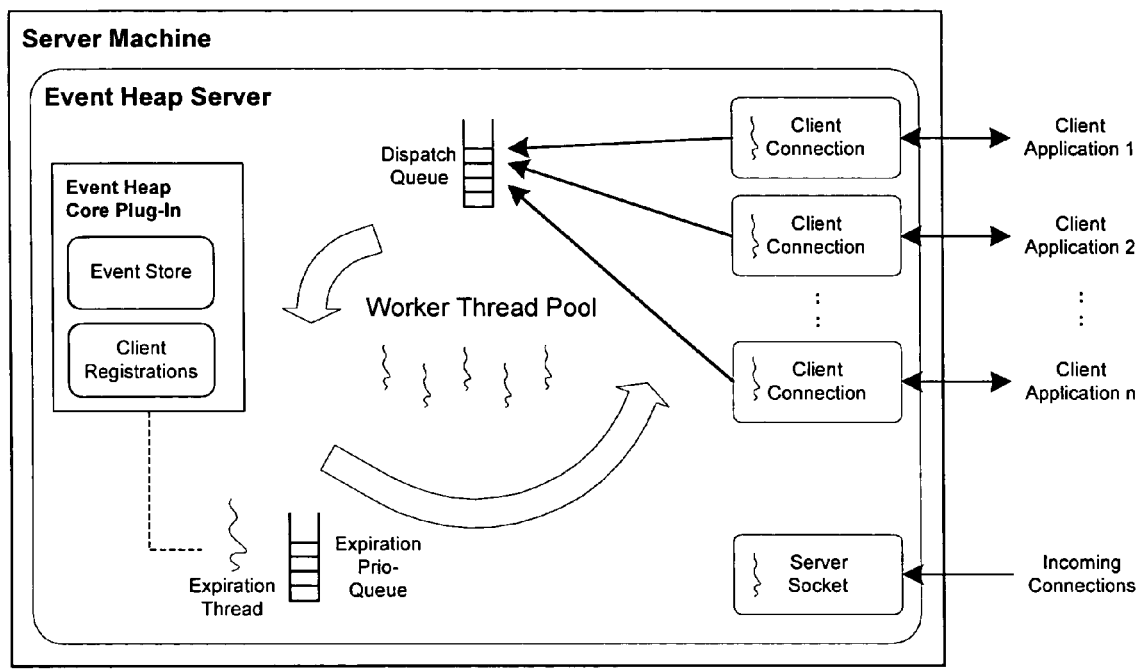
FIG. 11 illustrate an embodiment of the Event Heap Server.

The Event Heap server is a stand-alone Java application. It accepts connections from client applications, and then processes client requests and returns the appropriate results. FIG. 11 shows the Event Heap server architecture in which the server has seven major components: a server socket, a set of client connections, a dispatch queue, a worker thread pool, the Event Heap core plug-in, an expiration thread and an expiration priority-queue.

The server socket is responsible for accepting incoming connections from new client applications. For each request, it creates a new client connection object to handle further communication with that client application.

Each client connection has a thread that reads WireBundles containing requests from the client application, and then places them into the dispatch queue for processing. For 'putEvent,' 'deleteEvent,' and 'clear,' all of which expect no returned value, an ACK is sent back to the client immediately after the request is placed in the dispatch queue. The client connections are internally quite similar to the server connection object discussed in the previous section, and, in fact, they share most of the same code.

The worker thread pool handles the processing of all requests from clients. Each thread repeatedly reads a request off of the dispatch queue, calls into the Event Heap core plug-in to process the request, and then returns the result, if any, to the client by making a call to the client connection object. The number of threads in the worker pool is specifiable via a parameter passed to the Event Heap server at startup.

The Event Heap core plug-in is where most of the real work of the server is performed. It is defined as a standard interface, which implements a method for each of the requests that can be sent from client applications. Any class that implements the Event Heap core interface may be passed to the server at startup as a parameter. Currently there are three implementations of the Event Heap core: a null version that just discards the passed in parameters and returns nothing, a test core that just stores all events in arrays hashed by EventType and uses brute force search, and a normal core which tracks previously seen or skipped events for each client and skips testing them for a match in future requests.

Each core (except the null core) is divided into two basic components: the event store and the list of client registrations. The event store contains the actual copies of events for the server, and the list of client registrations contains the sets of templates for clients that are either performing a blocking retrieve, or are permanently registered to retrieve copies of events. Whenever a retrieve request is received, the core first checks for a match in the event store, then, if no match is found and the call is blocking, it adds the request to the list of client registrations. If a registration request comes in, it is immediately added to the list of registrations.

When a 'putEvent' request comes in, the event being placed is first tested against each registration. If the event matches a blocked 'waitForEvent' call, it returns a copy to the appropriate client and removes the registration. If the event matches a blocked 'waitToRemoveEvent,' it returns a copy to the appropriate client, removes the registration, and marks the event as being deleted. If the event matches a permanent registration, a copy is returned to the appropriate client, but the registration persists. After all registrations have been tested, and if the event has not been marked as being deleted, it is then placed into the event store. Note that since all registrations are always tested, it is not possible for a permanent registration to miss any event posted to the server.

Before the worker threads process the event through the event heap core plug-in, they add a deletion callback to the expiration priority queue with the time when the event should be expired. The expiration thread continuously sleeps until the time of the next expiration, then wakes up, pops the deletion callback off the priority queue and executes it, thereby deleting the event from the event store. The thread then sleeps until the execution time of the new head of the expiration priority-queue. To insure accurate deletion of expired events, the worker threads also check the deletion time of the head of the queue each time they insert a new deletion callback. If this time is later than the time for the deletion they are adding, they wake up the expiration thread so that it can calculate the new amount of time it needs to sleep and execute the just added deletion callback at the appropriate time.

Event Sequencing

To perform sequencing, each source tags every generated event with a Source, a SessionID, and a SequenceNum (sequence number). The Source needs to be unique among all sources participating in the Event Heap, so a random 32-bit integer is always appended to the source name (or instance name), which is specified by the calling application when the server connection is created. If no source name is specified, the application name with a random integer is used instead. The SessionID is also a 32-bit integer and is chosen randomly every time a source is instantiated. It is used to differentiate between events from before and after an application restart. SequenceNum starts at one and is incremented for each new event of a given type submitted during a given session. While using the random integers does not guarantee uniqueness for either Source or SessionID, the probability of collision is sufficiently low that they can be considered virtually unique.

On the receiver side, sequencing is accomplished by keeping track of the most recent event received from any given source. This information is sent with retrieval requests to the server and the server will only send back events that are newer than the most recent one indicated as having been seen by the receiver. Keeping the receiver specific state on the receivers insures that it isn't lost if the server is restarted.

Cross-Platform Methods of Accessing the Event Heap

Figure 12:
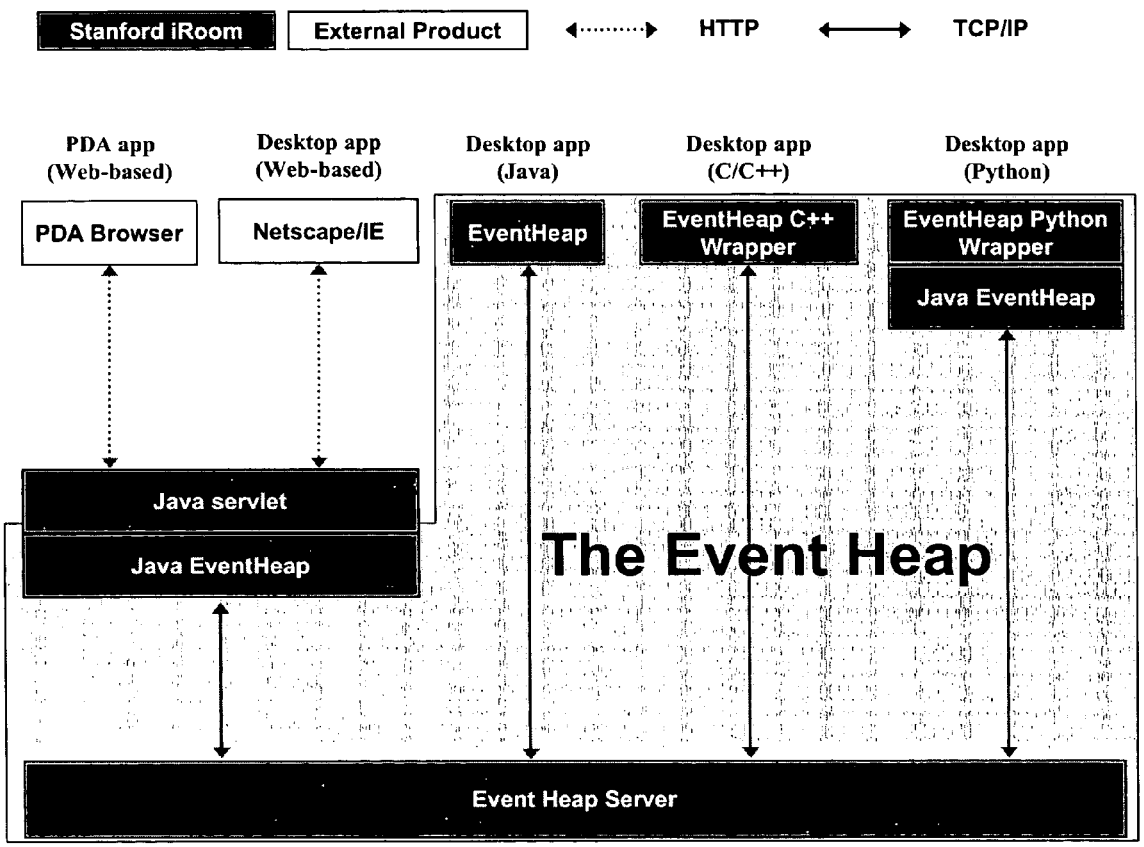
FIG. 12 illustrates various methods of accessing the Event Heap.

To support a heterogeneous collection of machines and legacy applications (characteristics T1 and T2), the Event Heap implementation supports a variety of access methods as shown in FIG. 12. Since web browsers and the web infrastructure are widely deployed, a web pathway is provided to let users encode event submission in URLs on web pages via HTTP. This has allowed many basic interactions to be easily prototyped by simply creating a web page with the appropriate event submission URLs. A simple web form interface is available to assist users in constructing the specially formatted URLs for event submission. This path has proven useful in allowing PDAs to participate in controlling the iRoom, since even Palm-type devices now have web browsers available.

Using the currently available paths and software API's, the Event Heap currently supports Windows®, Macintosh® OS X, Linux®, Palm® OS, and Windows® CE. As mentioned earlier, there is also a well-defined TCP/IP protocol for communicating with the Event Heap server, so it is relatively straightforward to write a client for any new platform that has socket support.

Event Heap Debugger

Figure 13:
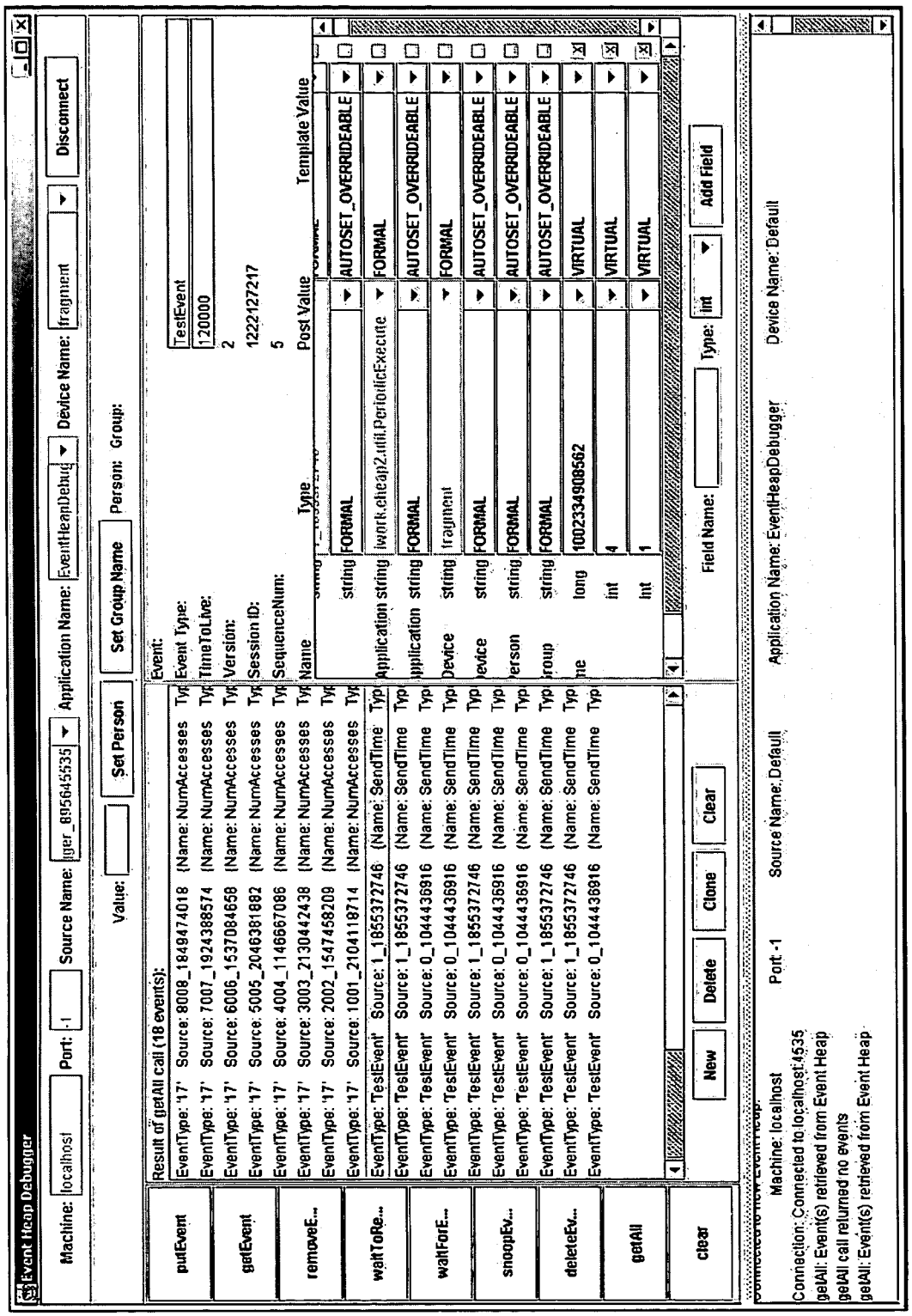
FIG. 13 is a screen snapshot of the Event Heap debugger with self-describing events.

Debugging the interactions of applications that use the Event Heap is theoretically simplified since all coordination is through a logically and physically centralized system. In practice, however, tools are required to allow monitoring of the communications. Therefore, to aid in debugging, we created the Event Heap debugger, a screen snapshot of which is shown in FIG. 13. Having the debugger helps provide for the easy debugging property (P6).

The debugger application is essentially a GUI interface to the entire Event Heap client API, with the exception of registration. It is implemented in Java using the Swing UI toolkit, and can be run as a stand-alone application or as a Java applet. The latter is particularly useful when the Event Heap server machine also runs a web server, as an unsigned version can be served which can interact with that Event Heap instance.

Monitoring the Event Heap with the debugger is straightforward. As can be seen from FIG. 13, self-describing fields are particularly useful in debugging and adapting applications. Since event fields have human readable names, it is relatively easy to look at the events and determine their function. One can look at the Event Heap in the debugger and determine whether an action didn't complete because no event was generated, or because the event did not reach a valid target.

Moreover, fields can be filled out indicating the Event Heap to which to connect, and a connection is created by clicking on a button. Once connected, events can be constructed via a simple user interface. These events can be posted by clicking on the 'putEvent' button, or used to retrieve events by clicking on one of the five event retrieval buttons. To monitor the current state of the Event Heap, the 'getAll' button can be used.

With 'getAll', one can observe events currently on the server and determine the type of event some application is using. The event can then be modified and re-posted to trigger related behavior. For example, one developer didn't know the format of events to trigger display of web pages on the SMART Boards in the iRoom, so he used the debugger to look at the events in the Event Heap after having submitted a web page display request from another application. He modified the event and re-posted it to verify it worked, and then modified his own application so that it was able to submit web-page display requests.

Example Code

This subsection contains actual code for a sender application and a receiver application that use the Event Heap. Sender sends out an event with some text meant to be rendered by a speech synthesizer somewhere in the interactive workspace. The receiver picks up these speech request events, synthesizes the audio, and plays it back to the computer on the local machine using the Java speech API. The two applications represent the minimum amount of code necessary to send and receive events to and from the Event Heap, sufficient to enable even a legacy application the basic level of coordination in an interactive workspace.

Sender Application

The sender application makes a connection to the Event Heap server, creates an event, sets two field values in the event, and then posts the event. The code is as follows:

```
import iwork.eheap2.*;
class SpeakText
{
    static void main(String [ ]args)
    {
    try{
        // Connect to Event Heap
        EventHeap theHeap=new EventHeap(args[0]);
        // Create event and set fields
        Event myEvent=new Event("AudioEvent");
        myEvent.setPostValue("AudioCommand", "Read");
        myEvent.setPostValue("Text", args[1]);
        // Put the event into the Event Heap
           theHeap.putEvent(myEvent);
        }
        catch(Exception e) {
          e.printStackTrace( );
        }
     } // end of main
} // end of SpeakText
```

Receiver Application

The receiver application creates a connection to the Event Heap server, creates a template event, sets one field in the event, and then loops forever waiting for the speech event, extracting the text to speak and calling the routine to synthesize and play back the text. The code is as follows:

```
import iwork.eheap2.*;
import javax.speech.*;
import javax.speech.synthesis.*;
class Speaker
{
    static void main(String [ ]args)
    {
    try{
        // Connect to the Event Heap
        EventHeap theHeap=new EventHeap(args[0]);
        // Create the template event
        Event myEvent=new Event("AudioEvent");
        myEvent.setTemplateValue("AudioCommand", "Read");
        // Loop forever retrieving events
        while(true) {
            try{
                // Block until a matching event arrives
                Event retEvent=theHeap.waitForEvent(myEvent);
                // Get the text to speak out of the event and say it
                simpleSpeak((String)(retEvent.getPostValue("Text")));
            }
            catch(Exception e) {
                e.printStackTrace( );
            }
        } // end of loop
    }
    catch(Exception e) {
        e.printStackTrace( );
    }
} // end of main
private static void simpleSpeak(String phrase) {
SynthesizerModeDesc mode = new SynthesizerModeDesc( );
Synthesizer synth = Central.createSynthesizer(mode);
// Get ready to speak
synth.allocate( );
synth.resume( );
// Speak
synth.speakPlainText(phrase, null);
// Wait till speaking is done
synth.waitEngineState(Synthesizer.QUEUE_EMPTY);
    } // end of simpleSpeak
} // end of Speaker
```

3.5 Performance

One of the characteristics for interactive workspaces is that the software infrastructure is bound by human performance needs (H3). Performance is not a feature designed into the Event Heap system, but rather a characteristic determined by features of the system and how well they have been implemented. Tests have verified that the Event Heap system can handle several hundred connected devices, and several hundred events per second at latencies of around 50 ms for a round trip (post to the Event Heap followed by a retrieval of the same event). The system's performance exceeds the needed 100 ms of latency, even under the conditions one can expect from an interactive workspace sized traffic load (P8).

We tested the performance on a cluster of 31 Linux workstations. Each machine was a dual-Pentium III 800 MHz with 256 MB of RAM with the exception of the server, which had 512 MB of RAM. Clients were distributed as evenly as possible across the client machines.

Figure 14:
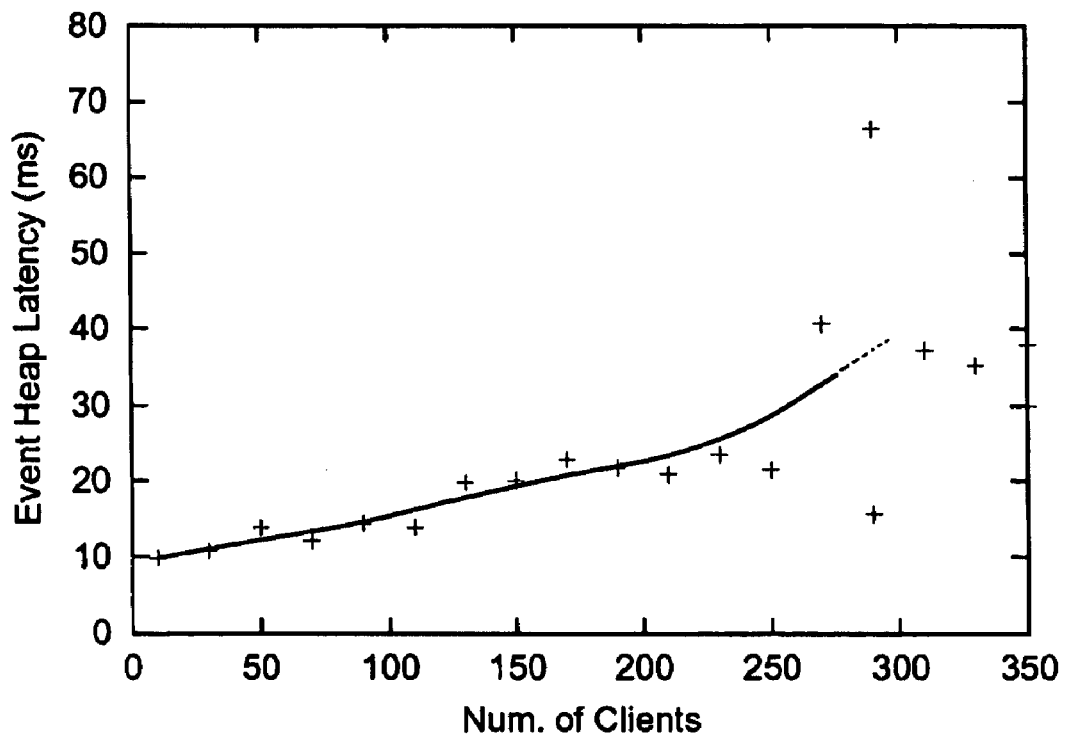
FIG. 14 plots the Event Heap latency per number of clients.

The first test measured the change in latency as more clients were connected to the Event Heap server with a constant traffic of 100 events per second distributed evenly across all the clients (except the client that measured the latency which performed the probe every second). Each of the clients used a different event type. The results of the test are shown in FIG. 14.

Figure 15:
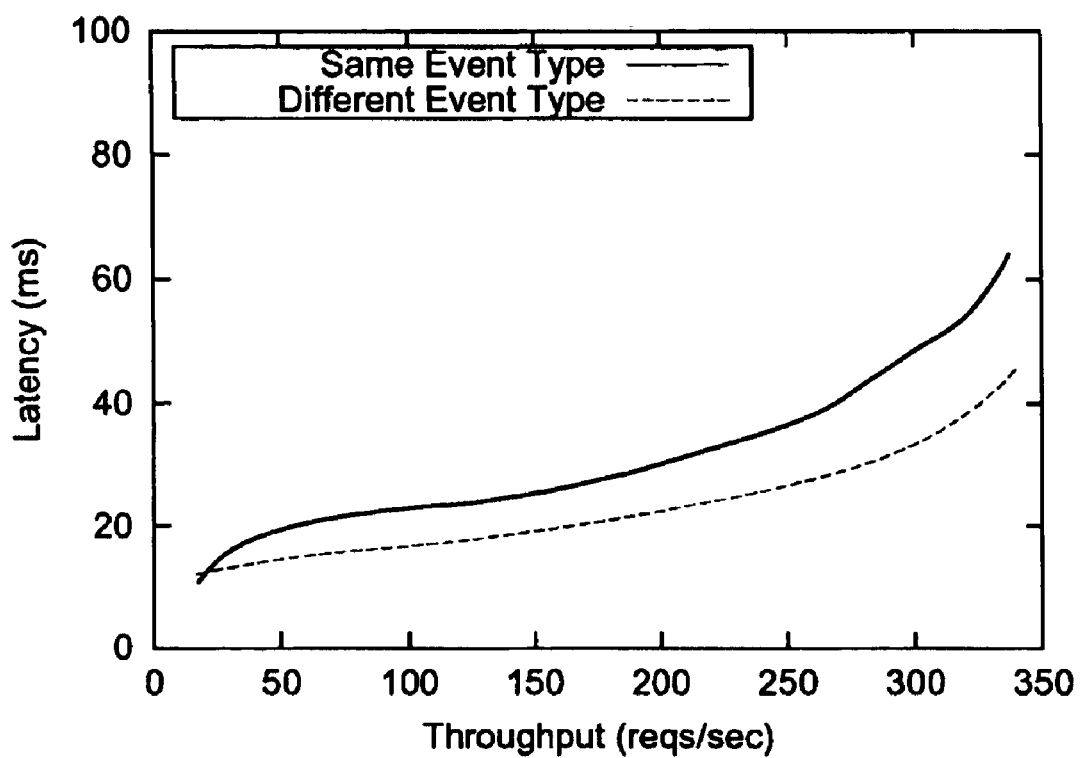
FIG. 15 plots the Event Heap latency per server throughput in two scenarios.

The second test measured the latency of the Event Heap system and server throughput. The total requests per second being generated across 100 clients were increased, as shown in FIG. 15. The test was run two times, once with all clients using different event types, indicated by the dashed line, and another time with all clients using the same event type, indicated by the solid line. The former reflects the potential situation where the server hashes by event type. The latter reflects the potential situation when many clients in the space are all beaconing using the same event type.

This test shows that the latency increases gradually with throughput until a server load of about 250 requests per second is reached, rising from about 15 ms to 20 ms when clients all use different event types. As might be expected, when clients all use the same event type the latency is slightly greater at all throughput levels, increasing to around 35 ms of latency at 250 requests/s. After 250 requests/s, the latency starts to go up more sharply for both types of event traffic, but even by 350 requests/s it only goes up to around 60 ms.

Figure 16:
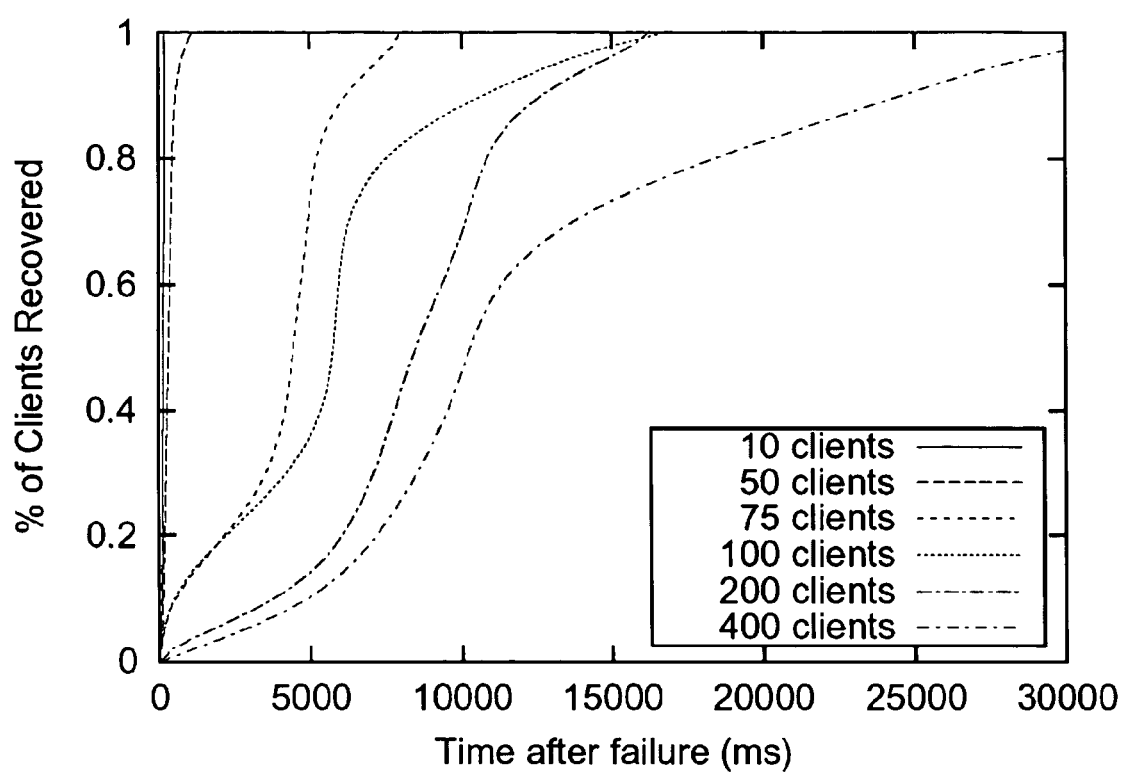
FIG. 16 shows the percentage of client reconnection after the Event Heap server comes up.

Another concern is how much of a disruption is caused by a crash in the Event Heap server. The server itself is run inside of a while loop in a script. Thus, as long as the crash is catastrophic, a new instance will be brought up immediately. Since all the clients automatically reconnect, the disruption will be equal to the time to restart the server plus the time for all the clients to reconnect. We measured server restart time as between 1.7 s and 2.7 s including the time to start up the Java virtual machine. FIG. 16 shows the percentage of clients that have reconnected as a function of the time after the Event Heap server comes up.

These tests show that the Event Heap implementation meets the traffic loads expected in an interactive workspace while maintaining perceptual instantaneity.

As one skilled in the art will appreciate, most digital computer systems can be programmed to implement the Event Heap. To the extent that a particular computer system is so programmed, it becomes a digital computer system within the scope and spirit of the present invention. That is, once a digital computer system is programmed to perform particular functions pursuant to computer-executable instructions from program software that implements the dynamic application coordination infrastructure disclosed herein, it in effect becomes a special purpose computer particular to the present invention. The necessary techniques to accomplish this are well known to those skilled in the art.

Computer programs implementing the Event Heap system can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art. The term "computer-readable medium" encompasses distribution media, intermediate storage media, execution memory of a computer, and any other medium or device capable of storing for later reading by a computer a computer program implementing the invention disclosed herein.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention.

We claim:

1. A computer system for exchanging events in an interactive workspace, comprising:
   (a) a plurality of heterogeneous software applications, called clients, wherein said clients are run by a plurality of heterogeneous machines of said interactive workspace;
   (b) a server for coordinating exchanges of a plurality of events between said clients, wherein each of said events comprises a set of unordered named fields and wherein each of said unordered named fields of each of said events comprises a post value and a template value;
   (c) a network for connecting said server and said plurality of clients;
   (d) a post function for allowing each of said clients to assign one or more of said post values to said unordered named fields of one of said events and to post said events, wherein said posted event is posted on said server; and
   (e) a retrieve function for allowing each of said clients to retrieve said posted event from said server, wherein said retrieve function allows each of said clients to assign one or more of said template values to said unordered named fields of one of said events, referred to as a template event, wherein said template value of one of said unordered named fields of said template event specifies a matching requirement on said post values of the same of said unordered named fields of said posted events, wherein said posted event is retrieved based on matching said one or more post values of said unordered named fields of said posted event with said one or more template values of said unordered named fields of said template event, and wherein said matching ignores a field order of some or all of said unordered named fields of said posted event and said template event; wherein said set of unordered named fields of each of said events comprises multiple standard source fields, wherein said set of unordered named fields further comprises a target field corresponding to each of said multiple standard source fields, wherein said standard source fields are associated with said clients posting said events, wherein said target fields are associated with said clients retrieving said events, and wherein said standard source fields and said corresponding target field are used for routing said events between said clients.

2. The system as set forth in claim 1, wherein said standard source fields include an application instance, an application name, a device name, a person, and a group, wherein said standard source fields are set to wildcards by default for said template events for retrieving said posted event, and wherein said target fields are set to wildcards by default for said posted events.

3. The system as set forth in claim 1, wherein said set of unordered named fields of each of said events includes multiple standard fields, wherein said standard fields comprise an EventType, a SequenceID, a TimeToLive, and a TimeStamp.

4. The system as set forth in claim 1, wherein said post and said template values of said unordered named fields can be marked as a formal value or a virtual value, wherein each of said unordered named fields marked as said formal value matches any value in said matching of said posted event with said template event, and wherein each of said unordered named fields marked as said virtual value is ignored in said matching of said posted event with said template event.

5. The system as set forth in claim 1, wherein said retrieve function retrieves one of said posted events at most once, and wherein said retrieve function retrieves the same of said posted events based on a first-in-first-out per source ordering.

6. The system as set forth in claim 1, further comprising a restart function for automatically reconnecting one or more of said clients to said server.

7. The system as set forth in claim 1, wherein said set of unordered named fields of said posted event comprises an expiration field for determining an expiration time of said posted event.

8. The system as set forth in claim 1, further comprising a query function for allowing each of said clients to register a query template event onto said server and to assign one or more values to said unordered named fields of said query template event, wherein said posted event is returned to said client that registered said query template event based on matching said one or more values of said unordered named fields of said posted event and said one or more values of said unordered named fields of said query template event, and wherein said posted event is returned to said client that registered said query template event only if said posted event is posted after said query template event is registered.

9. The system as set forth in claim 8, wherein said query function allows each of said clients to unregister said query template event, wherein said query template event is removed from said server when said query template event is unregistered.

10. The system as set forth in claim 1, wherein one of said clients posting one of said posted events does not directly communicate with said client retrieving the same of said posted events.

11. The system as set forth in claim 1, wherein said interactive workspace of said plurality of heterogeneous machines is in a bounded physical environment.

12. A method for exchanging events in an interactive workspace, comprising:
   (a) having a plurality of heterogeneous software applications, called clients, wherein said clients are run by a plurality of heterogeneous machines of said interactive workspace;
   (b) having a server for coordinating exchanges of a plurality of events between said clients, wherein each of said events comprises a set of unordered named fields, and wherein each of said unordered named fields of each of said events comprises a post value and a template value;
   (c) connecting said server and said plurality of clients through a network;
   (d) providing a post function for allowing each of said clients to assign one or more of said post values to said unordered named fields of one of said events and to post said events, wherein said posted event is posted on said server; and
   (e) providing a retrieve function for allowing each of said clients to retrieve said posted event from said server, wherein said retrieve function allows each of said clients to assign one or more of said template values to said unordered named fields of one of said events, referred to as a template event, wherein said template value of one of said unordered named fields of said template event specifies a matching requirement on said post values of the same of said unordered named fields of said posted events, wherein said posted event is retrieved based on matching said one or more post values of said unordered named fields of said posted event with said one or more template values of said unordered named fields of said template event, and wherein said matching ignores a field order of some or all of said unordered named fields of said posted event and said template event; wherein said set of unordered named fields of each of said events comprises multiple standard source fields, wherein said set of unordered named fields further comprises a target field corresponding to each of said multiple standard source fields, wherein said standard source fields are associated with said clients posting said events, wherein said target fields are associated with said clients retrieving said events, and wherein said standard source fields and said corresponding target field are used for routing said events between said clients.

13. The method as set forth in claim 12, wherein said set of unordered named fields of said posted event comprises an expiration field for determining an expiration time of said posted event.

14. The method as set forth in claim 12, further comprising providing a query function for allowing each of said clients to register a query template event onto said server and to assign one or more values to said unordered named fields of said query template event, wherein said posted event is returned to said client that registered said query template event based on matching said one or more values of said unordered named fields of said posted event and said one or more values of said unordered named fields of said query template event, and wherein said posted event is returned to said client that registered said query template event only if said posted event is posted after said query template event is registered.

15. The method as set forth in claim 14, wherein said query function allows each of said clients to unregister said query template event, wherein said query template event is removed from said server when said query template event is unregistered.

16. The method as set forth in claim 12, wherein said standard source fields include an application instance, an application name, a device name, a person, and a group, wherein said standard source fields are set to wildcards by default for said template events for retrieving said posted events, and wherein said target fields are set to wildcards by default for said posted events.

17. The method as set forth in claim 12, wherein said set of unordered named fields of each of said events comprises multiple standard fields, wherein said standard fields comprise an EventType, a SequenceID, a TimeToLive, and a TimeStamp.

18. The method as set forth in claim 12, wherein said post and said template values of said unordered named fields can be marked as a formal value or a virtual value, wherein each of said unordered named fields marked as said formal value matches any value in said matching of said posted event with said template event, and wherein each of said unordered named fields marked as said virtual value is ignored in said matching of said posted event with said template event.

19. The method as set forth in claim 12, wherein said retrieve function retrieves one of said posted events at most once, and wherein said retrieve function retrieves the same of said posted events based on a first-in-first-out per source ordering.

20. The method as set forth in claim 12, further comprising automatically reconnecting one of said clients to said server if the same of said client disconnects from said network.

21. The method as set forth in claim 12, wherein one of said clients posting one of said posted events does not directly communicate with said client retrieving the same of said posted events.

22. The method as set forth in claim 12, wherein said interactive workspace of said plurality of heterogeneous machines is in a bounded physical environment.

* * * * *